(12) United States Patent
Aio

(10) Patent No.: US 12,349,192 B2
(45) Date of Patent: Jul. 1, 2025

(54) WIRELESS COMMUNICATION DEVICE AND METHOD

(71) Applicant: Sony Group Corporation, Tokyo (JP)

(72) Inventor: Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 315 days.

(21) Appl. No.: 17/636,031

(22) PCT Filed: Aug. 27, 2020

(86) PCT No.: PCT/JP2020/032285
§ 371 (c)(1),
(2) Date: Feb. 17, 2022

(87) PCT Pub. No.: WO2021/049305
PCT Pub. Date: Mar. 18, 2021

(65) Prior Publication Data
US 2022/0287095 A1    Sep. 8, 2022

(30) Foreign Application Priority Data
Sep. 10, 2019   (JP) ................. 2019-164449

(51) Int. Cl.
*H04W 74/0816* (2024.01)
*H04W 72/0453* (2023.01)
*H04W 74/08* (2009.01)

(52) U.S. Cl.
CPC ... *H04W 74/0816* (2013.01); *H04W 72/0453* (2013.01); *H04W 74/0866* (2013.01)

(58) Field of Classification Search
CPC .............................. H04W 72/12; Y02D 30/70

USPC ......................................... 370/330, 338, 241
See application file for complete search history.

(56) References Cited

U.S. PATENT DOCUMENTS

| | | | |
|---|---|---|---|
| 2006/0019670 A1* | 1/2006 | Joung | H04W 48/08 455/450 |
| 2007/0104139 A1 | 5/2007 | Marinier | |
| 2014/0098748 A1* | 4/2014 | Chan | H04W 72/541 370/329 |
| 2014/0140288 A1* | 5/2014 | Jung | H04W 76/14 370/329 |

(Continued)

FOREIGN PATENT DOCUMENTS

JP    2016-019239 A    2/2016

OTHER PUBLICATIONS

International Search Report and Written Opinion mailed on Nov. 24, 2020, received for PCT Application PCT/JP2020/032285, Filed on Aug. 27, 2020, 9 pages including English Translation.

(Continued)

*Primary Examiner* — Kiet M Doan
(74) *Attorney, Agent, or Firm* — XSENSUS LLP

(57) ABSTRACT

The present technology relates to a wireless communication device and a method that make it possible to suppress signal collisions and a loss of an opportunity to acquire a transmission right. The wireless communication device transmits and receives signals to and from another wireless communication device, and determines a coordination recommendation channel to be recommended to the other wireless communication device in order to perform coordination communication. The present technology can be applied to wireless communication systems.

20 Claims, 29 Drawing Sheets

(56) References Cited

U.S. PATENT DOCUMENTS

| | | | |
|---|---|---|---|
| 2014/0362840 A1 | 12/2014 | Wong | |
| 2018/0310279 A1* | 10/2018 | Pathak | H04W 16/02 |
| 2019/0090175 A1* | 3/2019 | Mestanov | H04W 48/18 |
| 2020/0369695 A1* | 11/2020 | Raheja | C07F 9/65744 |
| 2021/0204333 A1* | 7/2021 | Hong | H04W 74/0841 |

OTHER PUBLICATIONS

Guo et al., "AP Coordination in EHT", Huawei Technologies, IEEE 802.11-19/0801r0, Available Online at:https://mentor.ieee.org/802.11/dcn/19/11-19-0801-00-00be-ap-coordination-in-eht.pptx, Mar. 11, 2019, 13 pages.

\* cited by examiner

WIRELESS COMMUNICATION DEVICE AND METHOD

CROSS-REFERENCE TO RELATED APPLICATIONS

The present application is based on PCT/JP2020/032285 filed on Aug. 27, 2020, which claims priority to Japanese Application No. 2019-164449, filed on Sep. 10, 2019, the entire contents of each are incorporated herein by reference.

TECHNICAL FIELD

The present technology relates to a wireless communication device and a method, and in particular, relates to a wireless communication device and a method that make it possible to suppress signal collisions and a loss of an opportunity to acquire a transmission right.

BACKGROUND ART

In IEEE 802.11 that establishes a standard of a wireless LAN, according to a multi input multi output (MIMO) technique standardized by IEEE 802.11n, both an access point (AP) which is a base station and a station (STA) which is a terminal can simultaneously transmit and receive a plurality of pieces of data using a plurality of wireless module and antennas.

In IEEE 802.11, an AP-to-AP coordination technique has been used as one AP candidate technique for IEEE 802.11be since May 2019. An AP-to-AP coordination technique is disclosed in, for example, PTL 1.

In order to perform coordination communication between a plurality of APs, it is necessary for the APs to exchange control signals and share data signals, and the APs have to be in a state where the APs can receive mutual transmission signals.

CITATION LIST

Patent Literature

[PTL 1]
JP 2016-019239 A

SUMMARY

Technical Problem

Currently, in order to set a state where APs can receive mutual transmission signals, primary channels of the APs have to be set to be the same channel. In this case, a primary channel of an STA connected to each AP has to be set to be the same channel, and there is a strong possibility that an opportunity to acquire a transmission right will be lost.

The present technology is contrived in view of such circumstances and makes it possible to suppress signal collisions and a loss of an opportunity to acquire a transmission right.

Solution to Problem

A wireless communication device according to an aspect of the present technology includes a wireless communication unit configured to transmit and receive signals to and from another wireless communication device, and a communication control unit configured to determine a coordination recommendation channel to be recommended to the other wireless communication device in order to perform coordination communication.

A wireless communication device according to another aspect of the present technology includes a wireless communication unit configured to transmit and receive signals to and from another wireless communication device, and receive a signal including information indicating a coordination recommendation channel recommended by the other wireless communication device in order to perform coordination communication, and a communication control unit configured to determine its own primary channel on the basis of the information indicating the coordination recommendation channel.

In the aspect of the present technology, signals are transmitted and received to and from another wireless communication device, and a coordination recommendation channel to be recommended to the other wireless communication device in order to perform coordination communication is determined.

In the other aspect of the present technology, signals are transmitted and received to and from another wireless communication device, a signal including information indicating a coordination recommendation channel recommended by the other wireless communication device in order to perform coordination communication is received, and its own primary channel is determined on the basis of the information indicating the coordination recommendation channel.

DESCRIPTION OF EMBODIMENTS

Hereinafter, embodiments of the present technology will be described. The description will be given in the following order.
1. Description of Background Art
2. System Configuration and Device Configuration
3. First Embodiment (Basic Configuration)
4. Second Embodiment (Case Where Request for Changing PCH is Performed Between APs)
5. Third Embodiment (Case Where There is Controller)
6. Others 1. Description of Background Art In IEEE 802.11 that establishes a standard of a wireless LAN, according to a multi input multi output (MIMO) technique standardized by IEEE 802.11n, both an AP which is a base station and an STA which is a terminal can simultaneously transmit and receive a plurality of pieces of data using a plurality of wireless module and antennas. Thereby, an improvement in a throughput and an improvement in reliability are realized.

A MIMO technique is evolving every time a new standard is established. For example, in IEEE 802.11ac, a down link (DL) multi-user (MU)-MIMO technique for allowing an AP to allocate a plurality of pieces of data to a plurality of STAs and performing multi-user communication is established. Further, in IEEE 802.11ax, an up link (UL) MU-MIMO technique for allowing a plurality of STAs to perform multi-user communication with an AP is established.

<DL MU-MIMO Technique>

Figure 1:
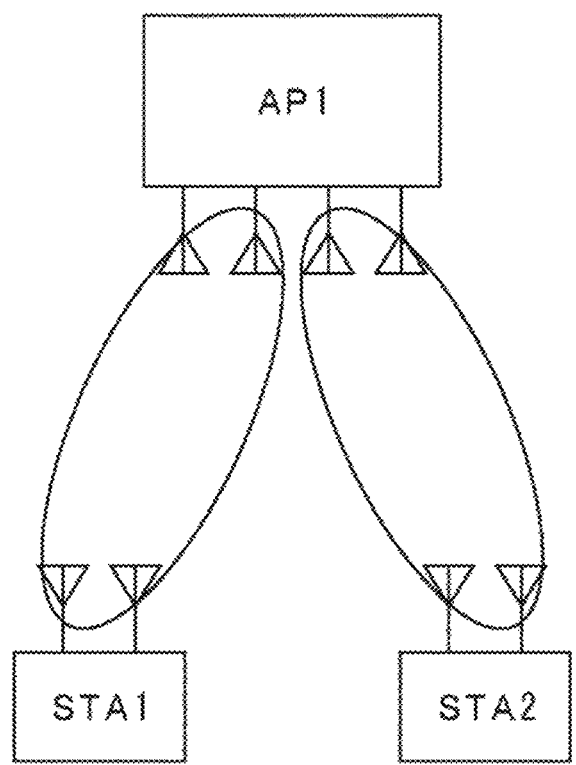
FIG. 1 is a diagram showing an example of a DL MU-MIMO technique.

FIG. 1 is a diagram showing an example of a DL MU-MIMO technique.

In FIG. 1, an AP1, an STA1, and an STA2 are connected to each other through wireless communication.

In the case of DL MU-MIMO, one AP1 transmits data to a plurality of STAs, that is, the STA1 and the STA2. In this case, the AP performs transmission waiting processing so that signals addressed to other STAs do not reach each STA. Thereby, the STA1 and the STA2 can extract only data addressed to themselves.

In IEEE 802.11, the establishment of a standard of IEEE 802.11be, which is a successor to IEEE 802.11ax, started in May 2019. An AP-to-AP coordination technique has been used as one candidate technique for IEEE 802.11be.

<AP-to-AP Coordination Technique>

Figure 2:
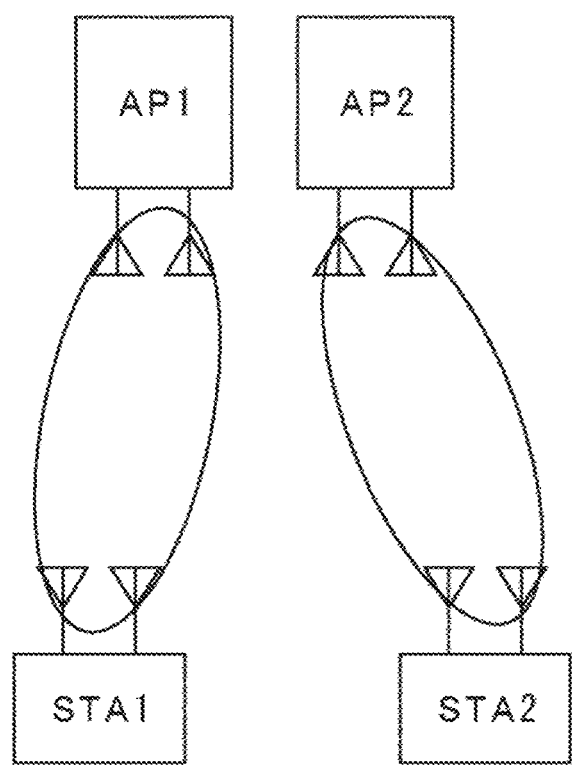
FIG. 2 is a diagram showing an example of an AP-to-AP coordination technique.

FIG. 2 is a diagram showing an example of an AP-to-AP coordination technique.

In FIG. 2, an AP1, an AP2, an STA1, and an STA2 are connected to each other through wireless communication.

In this example, the AP1 and the AP2 transmit data to the STA1 and the STA2. As illustrated in FIG. 2, basically there is a feature that the STA1 easily receives data from the AP1 closer thereto than the AP2, and the STA2 easily receives data from the AP2 closer thereto than the AP1.

In the AP-to-AP coordination technique shown in FIG. 2, the AP1 and the AP2 perform the transmission waiting processing described in FIG. 1 in coordination with each other. For example, in a case where the AP1 transmits data to the STA1, the AP1 controls signal strength so that the STA2 is not interfered with. Similarly, in a case where the AP2 transmits data to the STA2, the AP2 controls signal strength so that the STA1 is not interfered with. Thereby, the AP1 and the AP2 can simultaneously perform data transmission without interfering with each other and can realize an improvement in a throughput. In addition, compared to FIG. 1, the number of antennas for each AP can be expected to be reduced.

Meanwhile, for example, an AP-to-AP coordination technique also makes it possible to improve the reception quality of an STA by a plurality of APs transmitting data to the same STA in coordination with each other.

Incidentally, in a case where a plurality of APN are disposed close to each other in this manner, it is common for the APs to set and operate channels that are separated from each other so as not to interfere with each other. Hereinafter, channel setting and channel access of a general wireless local area network (LAN) will be described.

Figure 3:
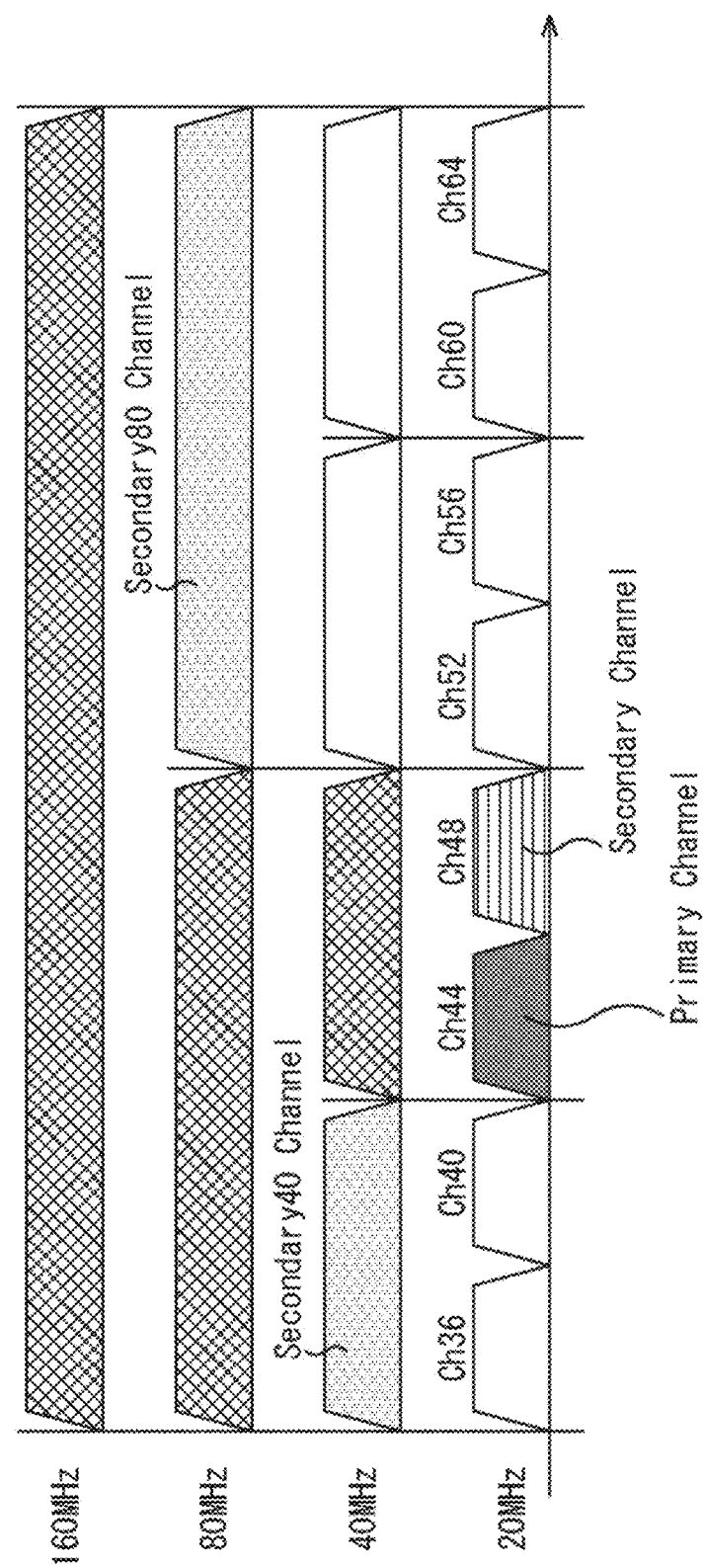
FIG. 3 is a diagram showing an example of Channel Allocation of a wireless LAN.

FIG. 3 is a diagram showing an example of Channel Allocation of a wireless LAN.

In FIG. 3, an example of a channel in bands of 5.2/5.3 GHz (5,170 to 5,330 MHz) is shown.

In bands of 5.2/5.3 GHz, as shown in FIG. 3, eight channels (Ch36/40/44/48/52/56/60/64) having a bandwidth of 20 MHz are set as a minimum unit. In addition, the numbers of channels having wide bandwidths (40 MHz, 80 MHz, 160 MHz) are also set to four, two, and one, respectively.

For example, when a certain AP has started to be operated, one channel (a bandwidth of 20 MHz) is selected from among bands to be used (in the case of FIG. 3, Ch44). In a wireless LAN standard, the channel is referred to as a primary channel (hereinafter, a PCH). Operations such as the transmission of a control signal to be described later and carrier sensing are performed using the PCH.

Further, in a case where an AP performs transmission using a wide bandwidth, a channel used additionally in the case of transmission with a bandwidth of 40 MHz is referred to as a secondary channel (in the case of FIG. 3, Ch48). A channel used additionally when transmission with a bandwidth of 80 MHz is performed is referred to as a secondary 40 channel (in the case of FIG. 3, Ch36/40). A channel used additionally when transmission with a bandwidth of 160

MHz is performed is referred to as a secondary 80 channel (in the case of FIG. 3, Ch52/56/60/64).

Hereinafter, the secondary 40 channel, the secondary 80 channel will be collectively referred to as secondary channels (SCHs). Meanwhile, currently, Channel Allocations other than those mentioned above (for example, transmission with a bandwidth of 40 MHz of Ch48/52) are not recognized as standards.

Figure 4:
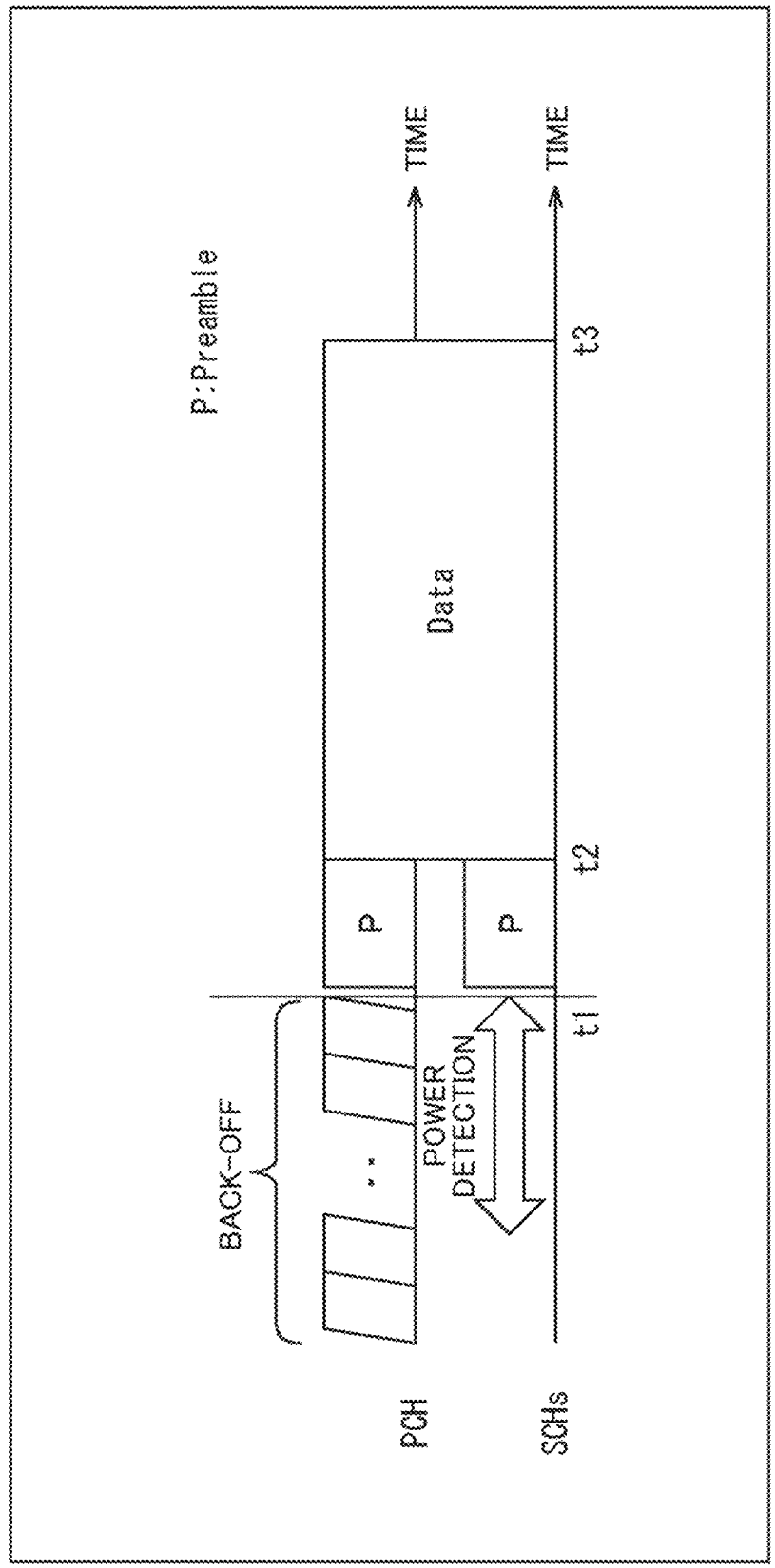
FIG. 4 is a diagram showing an example of a general sequence when data is transmitted with a wide bandwidth.

FIG. 4 is a diagram showing an example of a general sequence when data is transmitted with a wide bandwidth.

A transmission device performs a random time back-off (countdown). In a case where it is determined that other signals (a Preamble signal of a wireless LAN or an external signal) has not been detected on the PCH during back-off, the transmission device can acquire a transmission right at time t1. For example, in a case where a received power of an observed signal is equal to or less than a threshold value, the transmission device determines that other signals have not been detected.

In a case where a received power of an observed signal is equal to or greater than a threshold value partway and it is determined that other signals have not been detected, the transmission device transitions to a busy state and stops the back-off. Thereafter, the transmission device transitions to an idle state at a point in time when a signal has not been detected, and restarts the back-off.

On the other hand, in a case where the transmission device desires to transmit a signal with a wide bandwidth, the transmission device needs to perform power detection with the SCHs when the back-off of the PCH is being performed. Meanwhile, at this time, it is not necessary to detect a Preamble signal of a wireless LAN with the SCHs.

Further, in a case where the transmission device has acquired a transmission right in response to the back-off of the PCH, it is determined whether or not a signal can be transmitted with a wide bandwidth on the basis of power detection results of the SCHs. Summarizing the above, a rule of channel access of a wireless LAN is as follows.

(1) In a case where the transmission device has completed back-off with the PCH, transmission with a bandwidth of 20 MHz can be performed.
(2) In the case of (1), when a power detection result in the secondary channel is equal to or less than a threshold value for a fixed period of time, transmission with a bandwidth of 40 MHz can be performed.
(3) In the case of (2), when a power detection result in the secondary 40 channel is equal to or less than a threshold value for a fixed period of time, transmission with a bandwidth of 80 MHz can be performed.
(4) In the case of (3), when a power detection result in the secondary 80 channel is equal to or less than a threshold value for a fixed period of time, transmission with a bandwidth of 160 MHz can be performed.

In a case where the transmission device can perform transmission with a wide bandwidth in accordance with the above-described rule, the transmission device multiplexes (duplicates) a Preamble signal for giving notice of information for synchronization and reception of data signals transmitted by the PCH at time t1 in FIG. 4, and the same Preamble signal is transmitted by the SCHs. Thereafter, the transmission device transmits the data signals using a wide bandwidth at time t2, and completes the transmission of the data signals using a wide bandwidth at time t3.

According to the above-described rule of the channel access of the wireless LAN, the transmission device cannot transmit a data signal when the PCH is set to be in a busy state even when the SCHs are empty. Usually, in a PCH, a large number of Beacon signals and association-related signals are transmitted, and thus there is a strong possibility that an opportunity to acquire a transmission right for one transmission device will be lost in an environment in which there are a plurality of APs (or a basic service set (BSS)) having the same PCH set therein.

For this reason, in a wireless LAN, it is desirable for different PCHs to be set in APs located at short distances through channel scanning. Further, in a case where the APs desire to transmit data signals with a wide bandwidth, it is desirable for the PCHs of the APs to be farther apart from each other.

In order to perform coordination communication between the plurality of APs described above with reference to FIG. 2, it is necessary for the APs to exchange control signals and share data signals, and thus the APs have to be in a state where the APs can receive mutual transmission signals.

Currently, in order to set a state where the APs can receive mutual transmission signals, the PCHs of the APs have to be set to be the same channel. In this case, subordinate STAs connected to the respective APs also have to perform signal standby and back-off through carrier sensing in the same PCH, but there is an increasing possibility that an opportunity to acquire a transmission right will be lost as described above.

As in PTL 1 described above, when an AP has a wireless unit that can use a plurality of channels, communication between the APs and communication with a subordinate STA can be set for different PCHs, but in this case, device configurations of the APs are limited.

Consequently, in the present technology, signals are transmitted and received to and from other wireless communication devices, and a coordination recommendation channel to be recommended to other wireless communication devices in order to perform coordination communication is determined.

With such a configuration, the wireless communication device determines its own SCHs, which are different from its own PCHs, as coordination recommendation channels. Thereby, it is possible to suppress signal collisions and a loss of an opportunity to acquire a transmission right. In addition, coordination communication with other wireless communication devices can be performed.

2. System Configuration and Device Configuration

<Configuration Example of Wireless Communication System>

Figure 5:
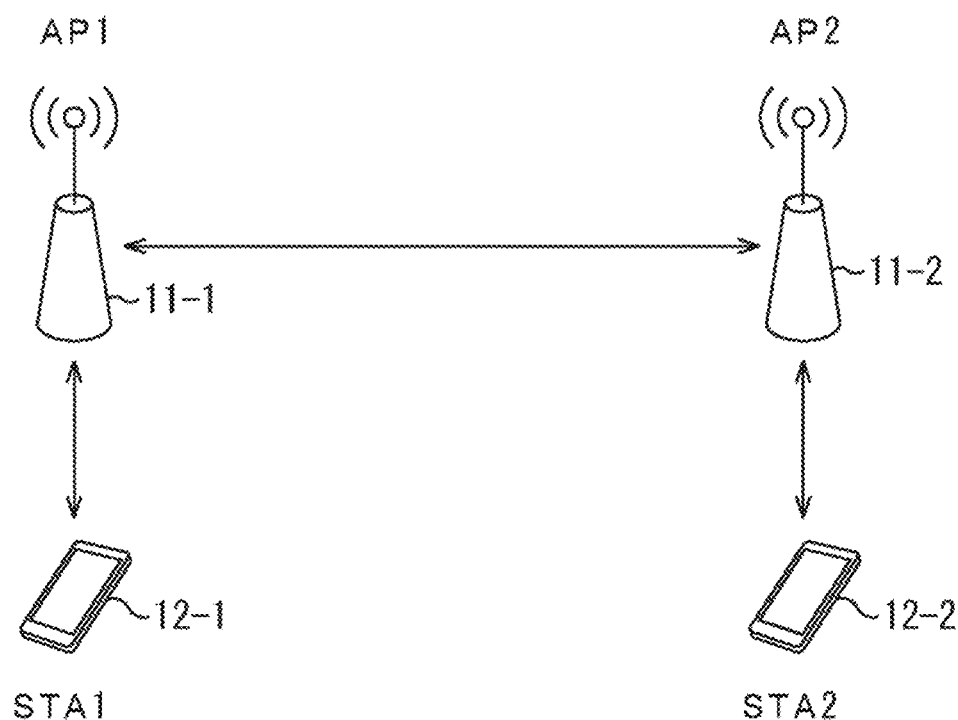
FIG. 5 is a diagram showing a configuration example of a wireless communication system according to an embodiment of the present technology.

FIG. 5 is a diagram showing a configuration example of the wireless communication system according to the embodiment of the present technology.

The wireless communication system in FIG. 5 is configured by the AP1 and the AP2 being connected to each other through wired communication or wireless communication. The AP1 and the AP2 are constituted by wireless communication devices 11-1 and 11-2, respectively. The wireless communication devices 11-1 and 11-2 will be referred to as a wireless communication device 11 in cases where there is no particular need to distinguish the wireless communication devices.

In addition, the wireless communication system is configured with the STA1 connected to the AP1 through wireless communication, and the STA2 connected to the AP2 through wireless communication. The STA1 connected to the AP1 through wireless communication is a subordinate STA of the AP1. The STA2 connected to the AP2 through wireless communication is a subordinate STA of the AP2.

The STA1 and the STA2 are constituted by wireless communication terminals 12-1 and 12-2, respectively. The wireless communication terminals 12-1 and 12-2 will be referred to as a wireless communication terminal 12 in cases where there is no particular need to distinguish the wireless communication devices.

It is assumed that there is a wireless communication device that uses a channel in the same band as the band used by the AP/STA in the surroundings.

Meanwhile, a target system configuration is not limited to the example in FIG. 5, and any configuration may be adopted as long as there are a plurality of APs for which connection therebetween has been established, and an STA is connected to each of the APs as a peripheral terminal.

<Configuration Example of Wireless Communication Device>

Figure 6:
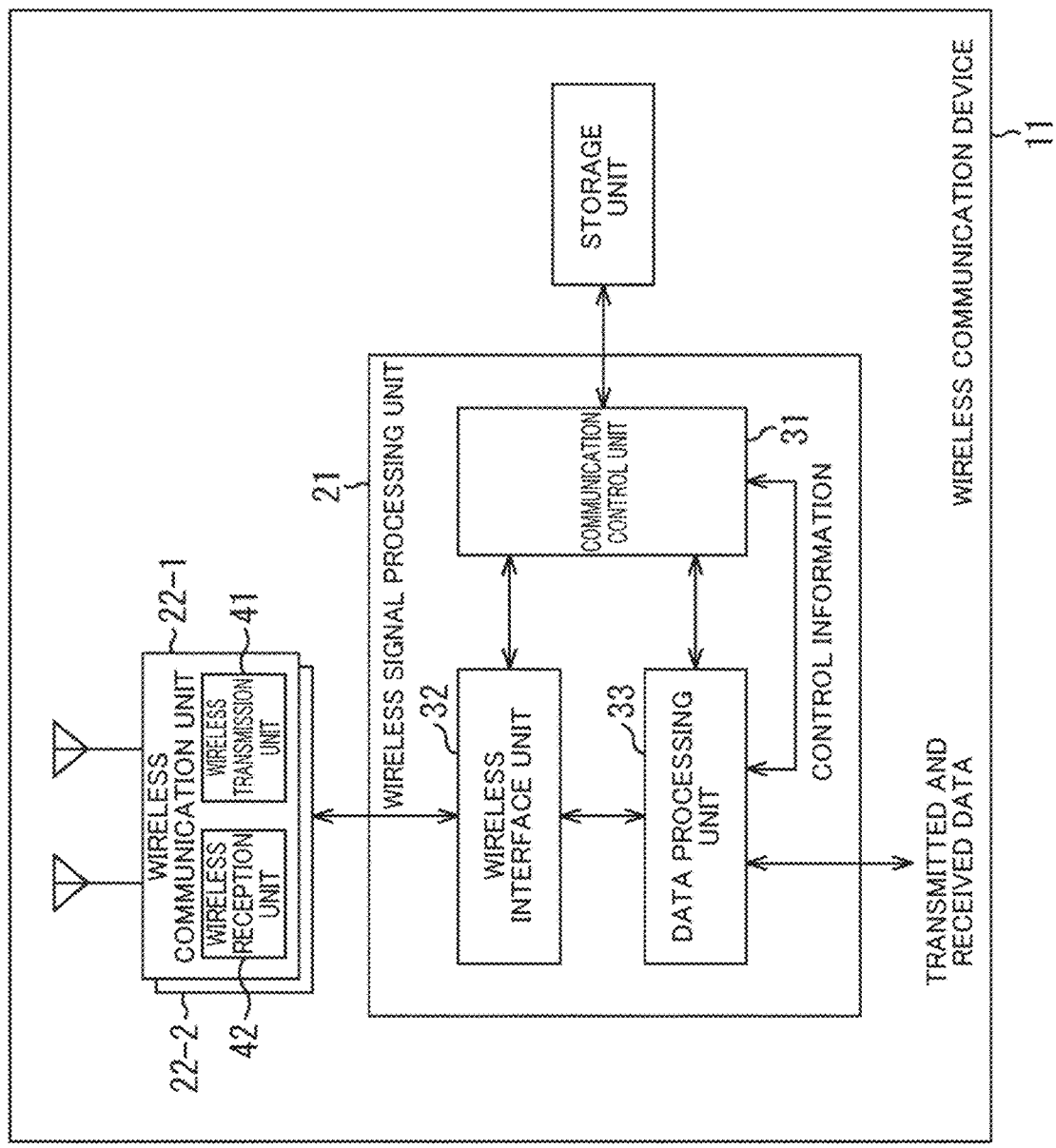
FIG. 6 is a block diagram showing a configuration example of a wireless communication device.

FIG. 6 is a block diagram showing a configuration example of the wireless communication device.

The wireless communication device 11 shown in FIG. 6 is a device that operates as an AP.

The wireless communication device 11 includes a wireless signal processing unit 21 and wireless communication units 22-1 and 22-2.

The wireless signal processing unit 21 controls communication with an AP and communication with an STA.

The wireless signal processing unit 21 includes a communication control unit 31, a wireless interface unit 32, a data processing unit 33, and a storage unit 34.

The communication control unit 31 is constituted by a central processing unit (CPU), a read only memory (ROM), a random access memory (RAM), or the like. The communication control unit 31 executes programs stored in the ROM, the storage unit 34, and the like and controls the overall operation of the wireless communication device 11. The communication control unit 31 controls the wireless communication units 22-1 and 22-2 through the wireless interface unit 32 and sets communication resources and the like. In addition, the communication control unit 31 performs processing for transferring control information of which another AP or STA is to be notified to the data processing unit 33.

The communication control unit 31 performs, for example, the generation of control information to be transmitted to another AP performing coordination communication and the selection of an optimal PCH for coordination communication.

The wireless interface unit 32 performs analog conversion into a transmission signal generated by the data processing unit 33 and converts the transmission signal from a digital signal to an analog signal. In addition, the wireless interface unit 32 performs digital conversion into received signals acquired by the wireless communication units 22-1 and 22-2 and converts the received signals from analog signals to digital signals.

The data processing unit 33 generates a transmission signal on the basis of transmitted data and control information received from the communication control unit 31 and outputs the generated transmission signal to the wireless interface unit 32.

The data processing unit 33 performs processing for demodulating the received signals converted by the wireless interface unit 32 and extracting received data and control information. The data processing unit 33 outputs the extracted control information to the communication control unit 31 and outputs the extracted received data to a higher layer such as an application layer not shown in the drawing.

The storage unit 34 stores predetermined programs and data.

Meanwhile, the wireless interface unit 32 may be provided outside the wireless signal processing unit 21.

Each of the wireless communication units 22-1 and 22-2 includes an antenna and performs wireless communication with an AP or an STA on the basis of communication resources set by the communication control unit 31. The wireless communication units 22-1 and 22-2 will be referred to as a wireless communication unit 22 in cases where there is no particular need to distinguish the wireless communication units. Meanwhile, the number of wireless communication units 22 is not limited to two, and a plurality of (n>1) wireless communication units 22-1 to 22-n can also be provided.

The wireless communication unit 22 includes a wireless reception unit 41 and a wireless transmission unit 42.

The wireless reception unit 41 performs RF processing on a wireless signal supplied from the antenna to generate a received signal and outputs the generated received signal to the wireless interface unit 32.

The wireless transmission unit 42 performs RF processing on a transmission signal supplied from the wireless interface unit 32 to generate a wireless signal. The wireless transmission unit 42 outputs the generated wireless signal to the antenna.

Meanwhile, electromagnetic waves received by the antenna are output to the wireless reception unit 41 as a wireless signal. In addition, the antenna emits the wireless signal generated by the wireless transmission unit 42 as electromagnetic waves.

Meanwhile, FIG. 6 shows an example in which each of the wireless signal processing unit 21 and the wireless communication unit 22 is configured as one IC, but an IC configuration of the present technology is not limited thereto. For example, the wireless interface unit 32 may be mounted as a separate IC.

3. First Embodiment (Basic Configuration)

First, as a first embodiment, an example in which an AP1 transmits information indicating a coordination recommendation channel to be recommended to an AP2 in order to perform coordination communication to the AP2, the information being included in a signal used for channel scanning for performing channel setting, will be described.

<Example of Overall Processing Sequence>

Figure 7:
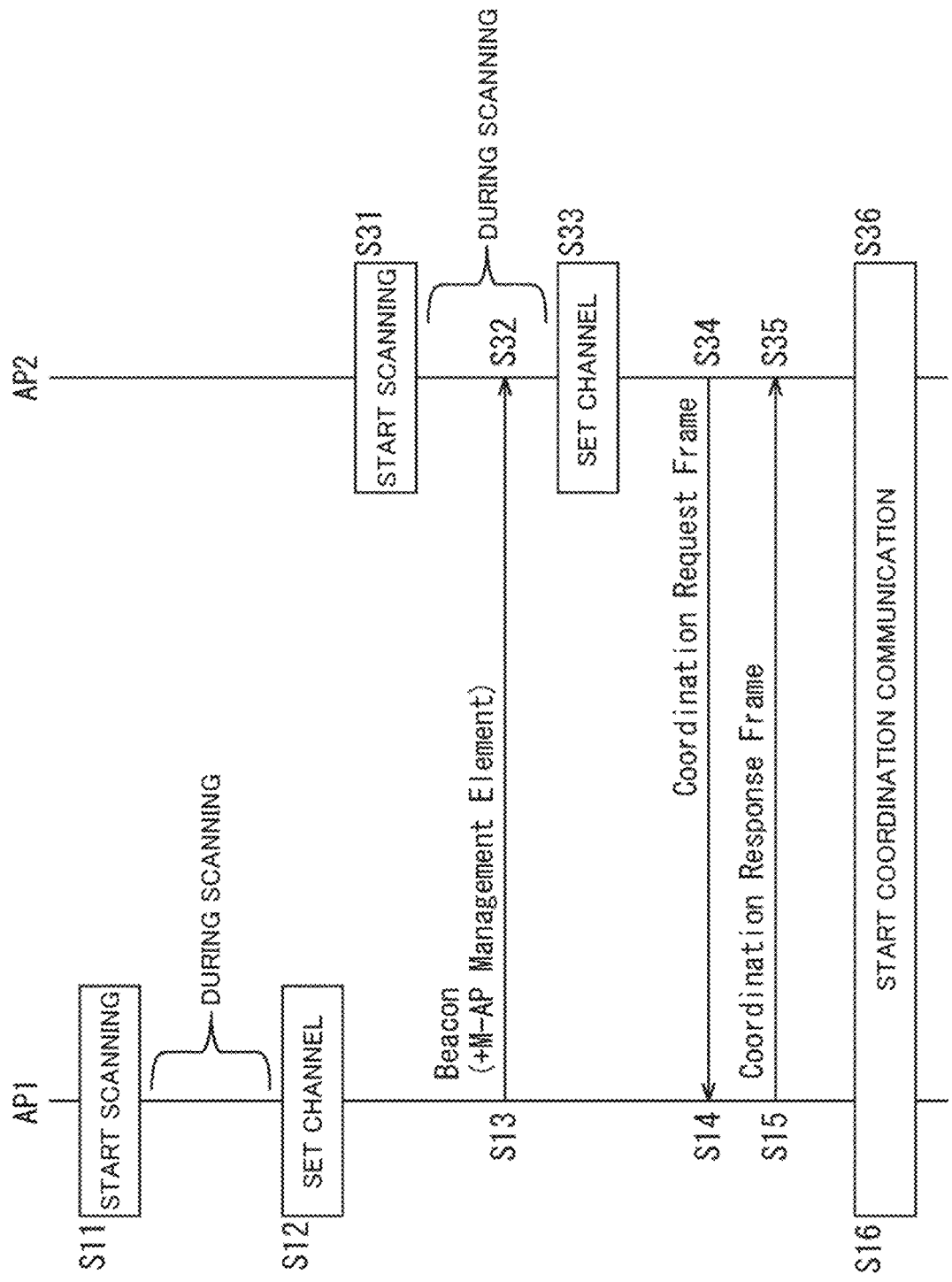
FIG. 7 is a diagram showing a sequence for describing the overall processing of the wireless communication system.

FIG. 7 is a sequence diagram showing the overall processing of a wireless communication system.

In step S11, the AP1 starts channel scanning for performing channel setting. In steps S11 to S12, the AP1 is shown performing scanning.

In step S12, the AP1 sets an empty channel as a PCH. In addition, the AP1 determines a coordination recommendation channel of another AP (AP2) that can perform coordination communication with the AP1 on the basis of a bandwidth that the AP1 requests (desires) (a minimum bandwidth desired to be secured: hereinafter referred to as a requirement BW). For example, it is desirable that any one secondary channel of the AP1 be included as a coordination recommendation channel.

In step S13, the AP1 includes information indicating the determined coordination recommendation channel (Coordination Recommended PCH Info.) in an M-AP Management Element (FIG. 8) to be described later, and transmits the information along with a Beacon signal. In this case, the Beacon signal is transmitted using its (AP1) own PCH.

On the other hand, the AP2 starts channel scanning in step S31. In steps S31 to S33, it is indicated that the AP2 is performing scanning.

In step S32, the AP2 receives the Beacon signal transmitted from the AP1. The AP2 can recognize the PCH of the AP1 by receiving the Beacon signal.

In step S33, the AP2 sets its own PCH on the basis of information indicating the coordination recommendation channel of the M-AP Management Element included in the received Beacon signal and channel scanning results.

In step S34, in a case where the AP2 desires to perform coordination communication with the AP1, the AP2 transmits a Coordination Request Frame which is a coordination request signal for requesting coordination communication to the AP1. In this case, the Coordination Request Frame is transmitted by a method shown in FIG. 14 to be described later.

In step S14, the AP1 receives the Coordination Request Frame transmitted from the AP2. In step S15, the AP1 transmits a Coordination Response Frame which is a response signal for giving notice of responding to coordination communication to the AP2. In this case, the Coordination Response Frame is transmitted by a method shown in FIG. 14 to be described later.

In step S35, the AP2 receives the Coordination Response Frame transmitted from the AP1.

In step S36, the AP2 starts coordination communication. In response to this, the AP1 also starts coordination communication in step S16.

After this, communication of data for coordination between the AP1 and the AP2 is performed as coordination communication, or coordination communication from the AP1 and the AP2 to the STA1 and STA2, or the like are performed. The same applies to the following drawings.

Meanwhile, similarly to the AP1, the AP2 transmits a Beacon signal including an M-AP Management Element after the coordination communication is started, and can also prompt another AP (for example, an AP3) to perform coordination communication. In this case, the AP2 determines information to be included in the M-AP Management Element on the basis of information of Common Multi-AP Coordination Info. (FIG. 10) in a Coordination Response Frame to be described later.

Meanwhile, a trigger for starting channel scanning of each AP is not particularly limited. For example, it does not matter if the power supply of the device is turned on or if its communication state has become worse. Further, in a case where there is an STA that has already been connected to the AP, the AP needs to notify the subordinate STA, stand by for a fixed period of time, and then change a PCH.

<Example of Frame Configuration of M-AP Management Element>

Figure 8:
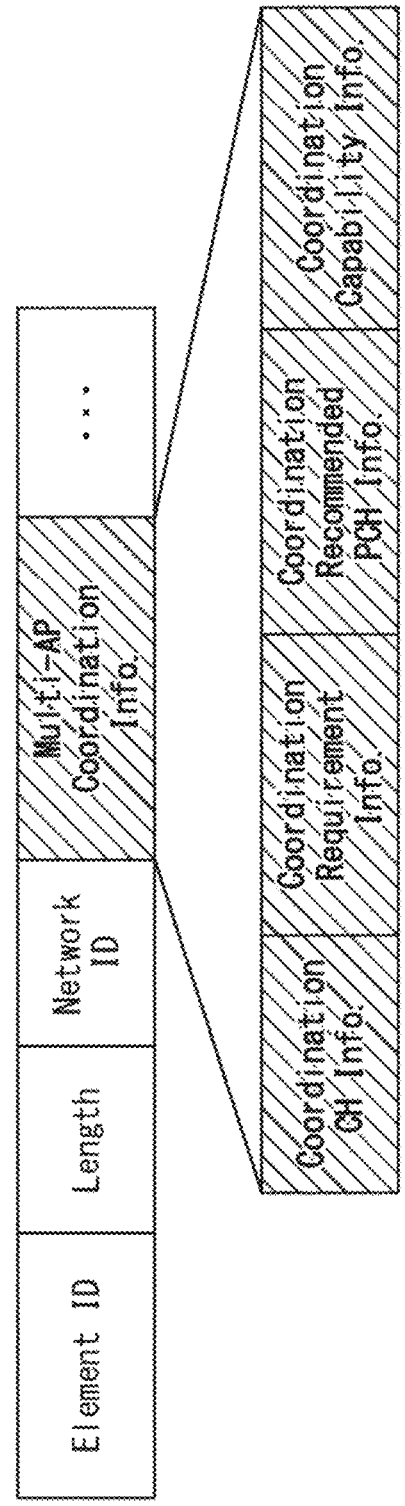
FIG. 8 is a diagram showing an example of a frame configuration of an M-AP Management Element.

FIG. 8 is a diagram showing an example of a frame configuration of an M-AP Management Element. Meanwhile, information of hatched portions in FIG. 8 is information on the present technology and indicates information that has not been described above. Thus, the above-described information is not hatched even when the information is information on the present technology. The same applies to the following drawings.

The M-AP Management Element is configured to include fields such as an Element ID, a Length, a Network ID, and Multi-AP Coordination Info.

Identification information indicating that this frame is an Element including information for coordination communication is included in the field of the Element ID.

Information on the length of the frame is included in the field of the Length.

Identification information on a Network to which a transmitter of the frame belongs is included in the field of the Network ID.

Setting information for an AP that requests (desires) coordination communication is included in the field of the Multi-AP Coordination Info.

Specifically, Coordination CH Info., Coordination Requirement Info., Coordination Recommended PCH Info., and Coordination Capability Info. are included in the field of the Multi-AP Coordination Info.

The Coordination CH Info. is channel information for performing communication between APs. In the case of the present embodiment, the Coordination CH Info. is information indicating a PCH of a transmitter.

The Coordination Requirement Info. is information on conditions of an AP that requests the transmitter to perform coordination communication. For example, the information on conditions of an AP includes being the same Network ID, the number of APs that can perform coordination communication, Flag information indicating that coordination communication cannot be performed, or the like.

The Coordination Recommended PCH Info. is information indicating a coordination recommendation channel of an AP that requests coordination communication. The Coordination Recommended PCH Info. may include an identifier of a channel such as CH36/40, or information such as a secondary channel/a secondary 40 channel may be designated.

The Coordination Capability Info. is Capability information which is information indicating a capability for performing communication between APs. The Capability information includes a bandwidth, the number of streams, a transmission method to be described later, and the like.

<Configuration Example of Coordination Request Frame>

Figure 9:
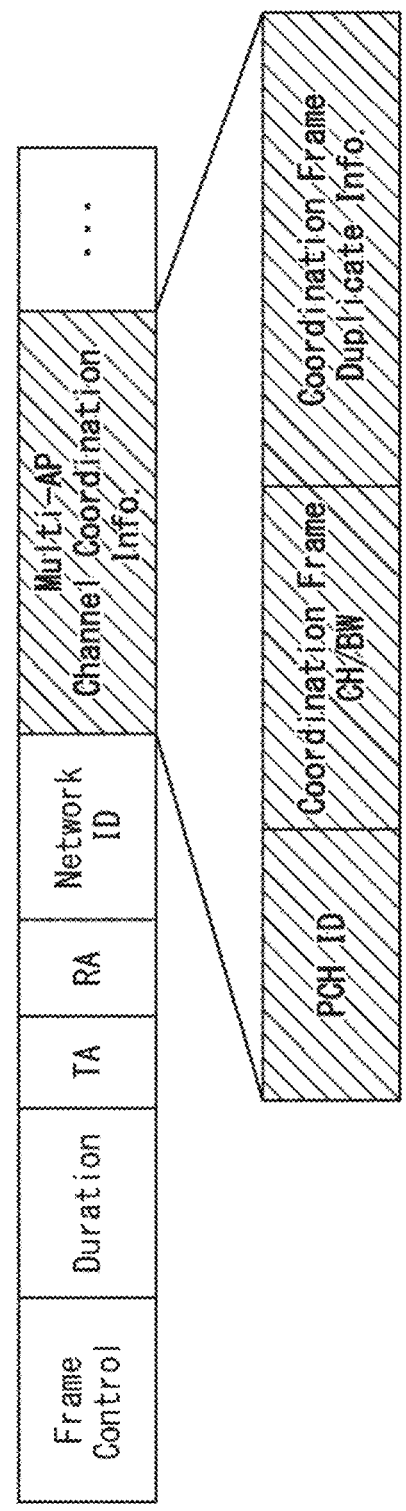
FIG. 9 is a diagram showing a configuration example of a Coordination Request Frame.

FIG. 9 is a diagram showing a configuration example of a Coordination Request Frame.

The Coordination Request Frame is configured to include fields such as Frame Control, a Duration, a TA, an RA, a Network ID, and Multi-AP Channel Coordination Info.

The field of the Frame Control includes identification information indicating that this frame is a Coordination Request Frame exchanged between APs.

The field of the Duration includes information on a scheduled period used by a wireless line.

The field of the TA includes a MAC address of a transmitter.

The field of the RA includes a MAC address of a transmission destination.

The field of the Network ID includes identification information on a Network to which the transmitter belongs.

The field of the Multi-AP Channel Coordination Info includes information on a channel set by an AP (for example, an AP2) that desires coordination communication.

Specifically, the field of the Multi-AP Channel Coordination Info includes a PCH ID, a Coordination Frame CH/BW, and Coordination Frame Duplicate Info.

The PCH ID is an identifier of a PCH set by an AP that requests coordination communication.

The Coordination Frame CH/BW is information on a channel and a bandwidth used when coordination communication is performed between APs. Meanwhile, in the Coordination Frame CH/BW, an identifier of a channel such as Ch36/40 may be included, or information such as a secondary channel/a secondary 40 channel may be designated.

The Coordination Frame Duplicate Info. is information indicating by which transmission method a Coordination Frame (data for coordination) is transmitted in each band. Specifically, the Coordination Frame Duplicate Info. is information, which is to be described later, regarding whether or not transmission is performed by duplication.

Meanwhile, details of the Coordination Frame CH/BW and the Coordination Frame Duplicate Info. will be described later in FIG. 14.

<Configuration Example of Coordination Response Frame>

Figure 10:
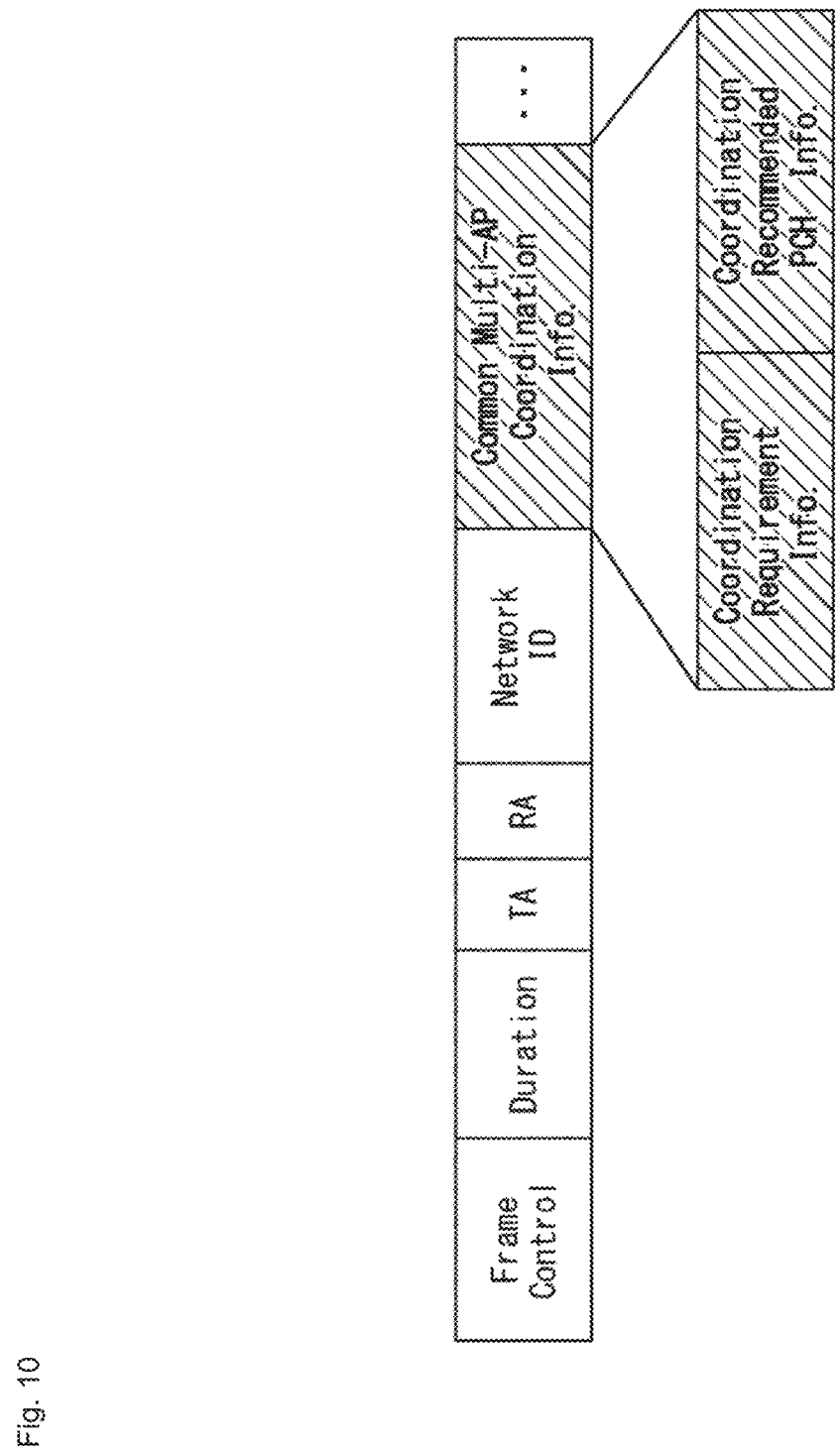
FIG. 10 is a diagram showing a configuration example of a Coordination Response Frame.

FIG. 10 is a diagram showing a configuration example of a Coordination Response Frame.

The Coordination Response Frame is configured to include fields such as Frame Control, a Duration, a TA, an RA, a Network ID, and Common Multi-AP Coordination Info.

The field of the Frame Control includes information indicating that this frame is a Coordination Response Frame exchanged between APs.

The field of the Duration includes information on a scheduled period used by a wireless line.

The field of the TA includes a MAC address of a transmitter.

The field of the RA includes a MAC address of a transmission destination.

The field of the Network ID includes identification information on a Network to which the transmitter belongs.

The field of the Common Multi-AP Coordination Info includes information set in common and shared by APs performing coordination communication. Information included in the field of the Common Multi-AP Coordination Info. is updated in response to the reception of a Coordination Request Frame, and the updated information is shared between APs performing coordination communication.

In the field of the Common Multi-AP Coordination Info., for example, the Coordination Requirement Info., the Coordination Recommended PCH Info., and the like of FIG. 8 are included as information to be shared. In addition, an M-AP Management Element to be transmitted to another AP that desires coordination communication is generated on the basis of the shared information, and is included in a Beacon signal and transmitted.

<Channel Setting Operation>

Figure 11:
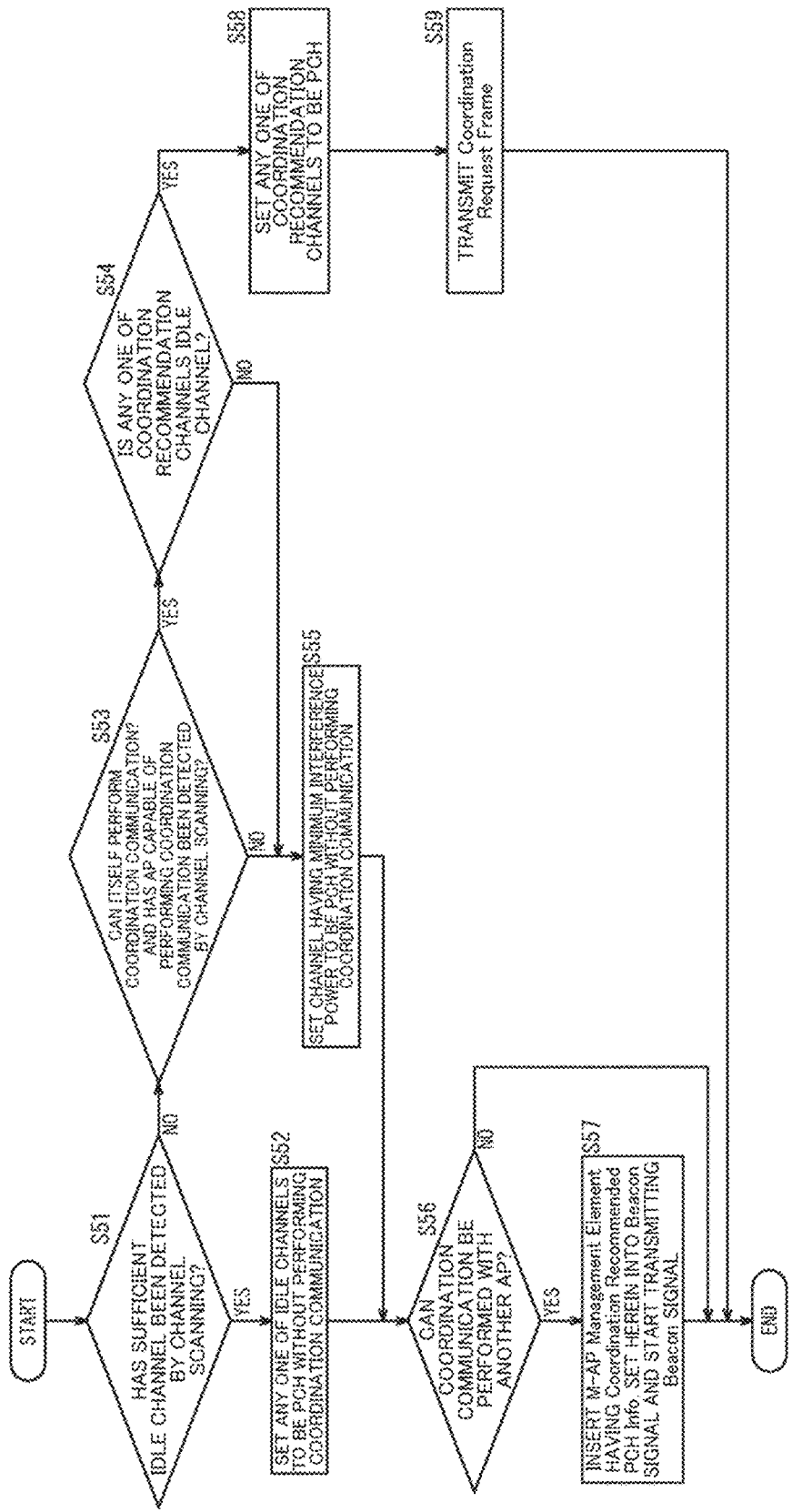
FIG. 11 is a flowchart showing channel setting processing of an AP.

FIG. 11 is a flowchart showing channel setting processing of an AP.

FIG. 11 shows processing, which is common to the AP1 and the AP2, for setting its own PCH on the basis of channel scanning results.

In step S51, the communication control unit 31 of the AP determines whether or not a sufficient idle channel could be detected through channel scanning on the basis of channel scanning results. The sufficient idle channel mentioned here is an idle channel corresponding to a band that the communication control unit desires to transmit. In addition, the idle channel is a channel in which the reception level of a signal observed during scanning is equal to or less than a threshold value.

In a case where it is determined in step S51 that a sufficient idle channel has been detected, the processing proceeds to step S52.

In step S52, the communication control unit 31 sets any one idle channel to be a PCH without performing coordination communication.

On the other hand, in a case where it is determined in step S51 that a sufficient idle channel cannot be detected, the processing proceeds to step S53.

It is determined in step S53 whether or not the communication control unit 31 can perform coordination communication and whether or not an AP capable of performing coordination communication has been detected through channel scanning.

In a case where it is determined in step S53 that the communication control unit cannot perform coordination communication or whether an AP capable of performing coordination communication has not been detected through channel scanning, the processing proceeds to step S55.

Here, the fact that an AP capable of performing coordination communication has not been detected means a case where a Beacon signal including an M-AP Management Element cannot be detected or a case where it is determined that a Beacon signal can be detected but coordination communication with a transmitter cannot be performed in accordance with Coordination Requirement Info. included in the M-AP Management Element.

On the other hand, in a case where it is determined in step S53 that the communication control unit can perform coordination communication and it is determined that an AP capable of performing coordination communication has been detected by receiving a Beacon signal including M-AP Management, or the like through channel scanning, the processing proceeds to step S54.

In step S54, the communication control unit 31 determines whether any one coordination recommendation channel is an idle channel. The communication control unit 31 confirms information on the Coordination Recommended PCH Info. included in the M-AP Management Element. In a case where an idle channel is not included in the coordination recommendation channel designated by the Coordination Recommended PCH Info., it is determined in step S54 that an idle channel is not included in any of the coordination recommendation channels, the processing proceeds to step S55.

In step S55, the communication control unit 31 sets a channel having a minimum interference power to be a PCH among channels having been subjected to channel scanning without performing coordination communication.

After step S52 or step S55, the processing proceeds to step S56.

In step S56, the communication control unit 31 determines whether or not coordination communication with another AP can be performed. In a case where it is determined in step S56 that coordination communication can be performed, the processing proceeds to step S57.

In step S57, the communication control unit 31 inserts the M-AP Management Element having the Coordination Recommended PCH Info. (FIG. 8) set herein into a Beacon signal and causes the wireless transmission unit 42 to start to transmit the Beacon signal. Meanwhile, the process of step S57 corresponds to the process of step S13 of the AP1 shown in FIG. 7. Thereafter, the channel setting processing is terminated.

Further, in a case where it is determined in step S56 that coordination communication cannot be performed, step S57 is skipped. Thereafter, the channel setting processing is terminated.

On the other hand, in step S54, in a case where an idle channel is included in the coordination recommendation channel designated by the Coordination Recommended PCH Info., it is determined that any one coordination recommendation channel is an idle channel, and the processing proceeds to step S58.

In step S58, the communication control unit 31 sets any one channel, which is a coordination recommendation channel and is an idle channel, to be its own PCH. Meanwhile, the process of step S58 corresponds to the process of step S33 of the AP2 shown in FIG. 7.

In step S59, the wireless transmission unit 42 transmits a Coordination Request Frame for requesting coordination communication to a transmitter of the Beacon signal. Meanwhile, the process of step S59 corresponds to the process of step S34 of the AP2 shown in FIG. 7. Thereafter, the channel setting processing is terminated.

Effects of First Embodiment

Figure 12:
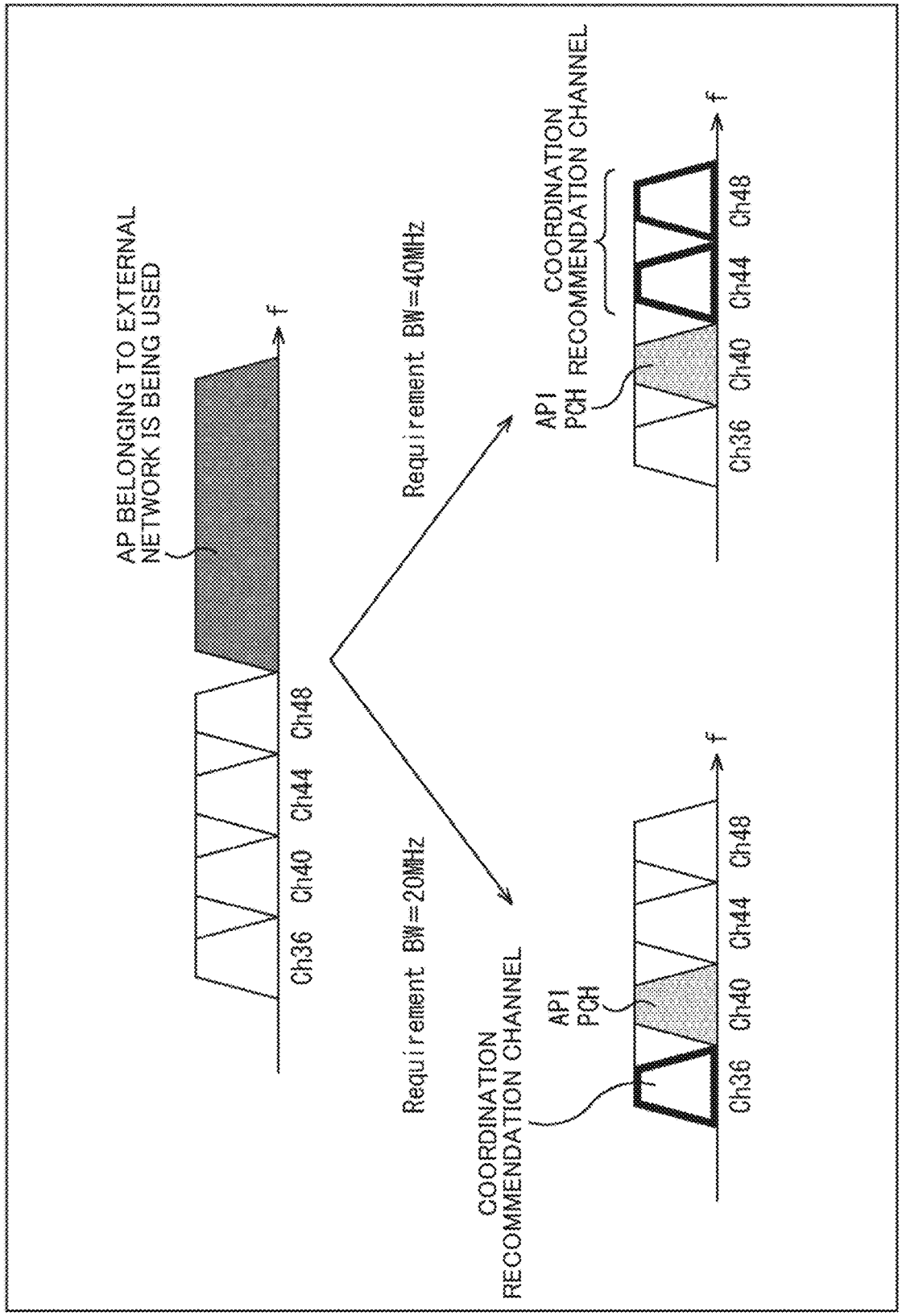
FIG. 12 is a diagram showing a first example of an effect in a first embodiment of the present technology.

FIG. 12 is a diagram showing a first example of the effects in the first embodiment of the present technology.

FIG. 12 shows an example of an operation in which the AP1 determines its own PCH on the basis of channel scanning results. Description will be given in order from the top in the drawing.

It is assumed that the AP1 has detected that Ch36/40/44/48 are idle channels and the other channels (for example, Ch52/56/60/64 and the like) are being used by APs that belong to an external network (that is, APs that cannot perform coordination communication), on the basis of channel scanning results.

In this case, the AP1 sets any one of empty Ch36/40/44/48 to be a PCH and determines a coordination recommendation channel for other APs that requests (desires) coordination communication, on the basis of a Requirement BW (a bandwidth that the AP1 desires).

When the Requirement BW of the AP1 is 20 MHz, the AP1 determines a coordination recommendation channel to be Ch36 as shown on a lower left side in FIG. 12. On the other hand, when the Requirement BW of the AP1 is 40 MHz, the AP1 determines a coordination recommendation channel to be Ch44/48 as shown on a lower right side in FIG. 12.

Thereafter, the AP1 inserts M-AP Management including information on the above-described coordination recommendation channel into a Beacon signal and transmits the Beacon signal.

Meanwhile, as will be described later, a PCH of another AP requesting coordination communication can minimize a bandwidth when one closer to the PCH of the AP1 (that is, the order of secondary>secondary 40>secondary 80) communicates data for coordination, and the quality of reception of a signal is improved.

On the other hand, when a channel adjacent to the AP1 (in the case of the example shown in FIG. 12, Ch36) is used for an AP that can perform coordination communication, a probability that the AP1 can perform transmission with a bandwidth of 40 MHz in accordance with power detection results is reduced. Thus, it is desirable that a PCH of an AP that can perform coordination communication is set outside a Requirement BW (a bandwidth that the AP1 desires to secure). The Requirement BW may depend on the AP's own parameters or may be a parameter obtained from external information such as communication status or the like.

Figure 13:
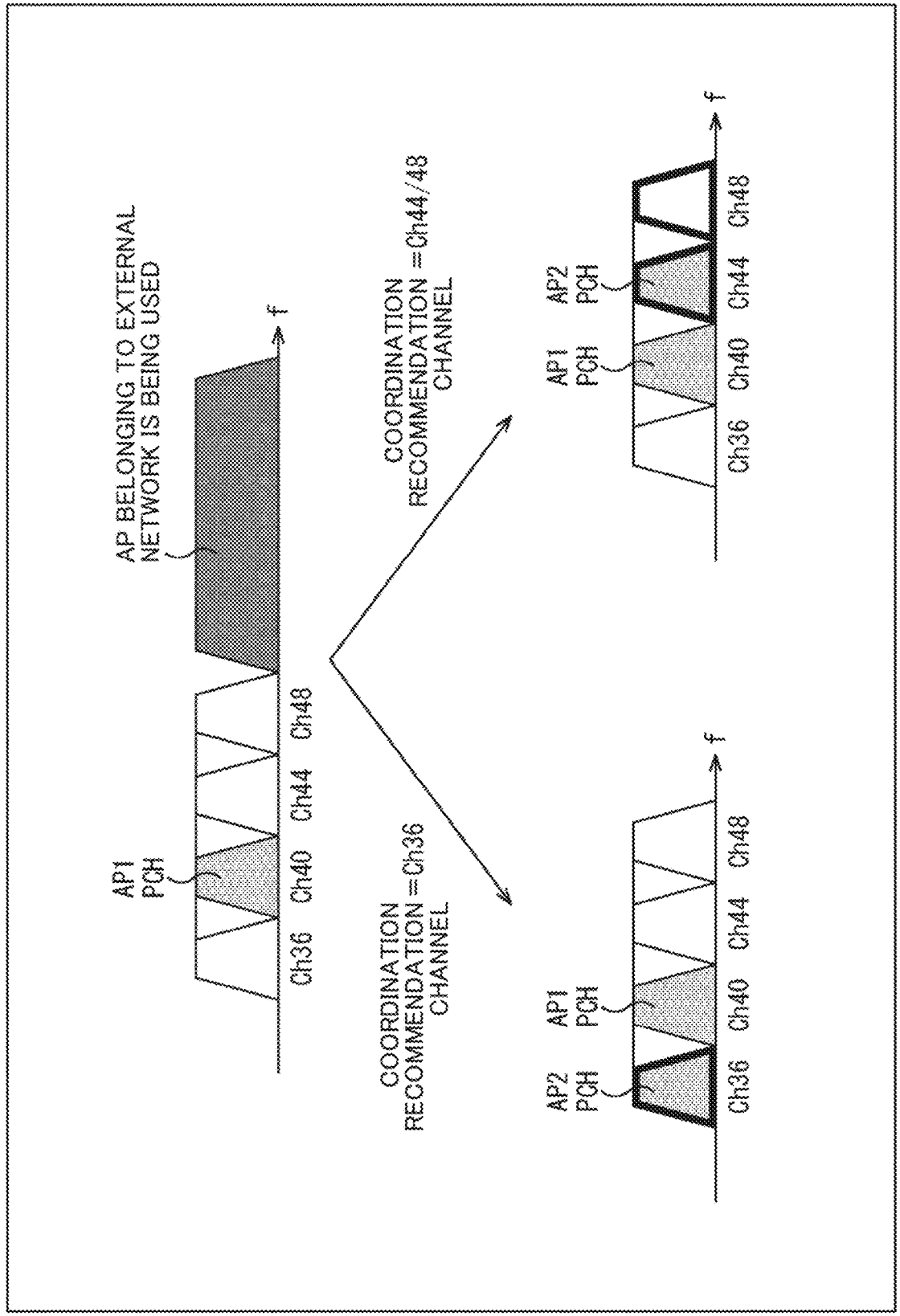
FIG. 13 is a diagram showing a second example of an effect in the first embodiment of the present technology.

FIG. 13 is a diagram showing a second example of the effects in the first embodiment of the present technology.

FIG. 13 shows an example of an operation in which the AP2 determines its own PCH on the basis of channel scanning results. Description will be given in order from the top in the drawing.

It is assumed that the AP2 has detected that Ch36/44/48 are idle channels, Ch40 is being used by the AP1, and the other channels (for example, Ch52/56/60/64 and the like) are being used by APs that belong to an external network (that is, APs that cannot perform coordination communication), on the basis of channel scanning results.

In this case, the AP2 understands that the AP1 can perform coordination communication from the M-AP Management Element included in the Beacon signal transmitted from the AP1, and sets any one coordination recommendation channel of the AP1 to be its own PCH. In a case where the coordination recommendation channel indicates Ch36, the AP2 sets Ch36 to be a PCH as shown on a lower left side in FIG. 13. Further, in a case where the coordination recommendation channel indicates Ch44/48, the AP2 sets Ch44 or Ch48 to be a PCH as shown on a lower right side in FIG. 13.

Meanwhile, in a case where a plurality of candidates are designated as a coordination recommendation channel, the AP2 may set a preferred channel to be a PCH, but it is desirable that a channel as close to the PCH of the AP1 as possible is set a PCH from the viewpoint of the quality of reception described above.

In addition, as described above with reference to a flowchart of FIG. 11, in a case where the AP2 has detected an idle channel other than Ch36/44/48, the AP2 can also be operated as a separate channel without performing coordination communication with the AP1. With such a configuration, the AP2 can request the AP1 to perform coordination communication only when coordination communication is actually required.

Figure 14:
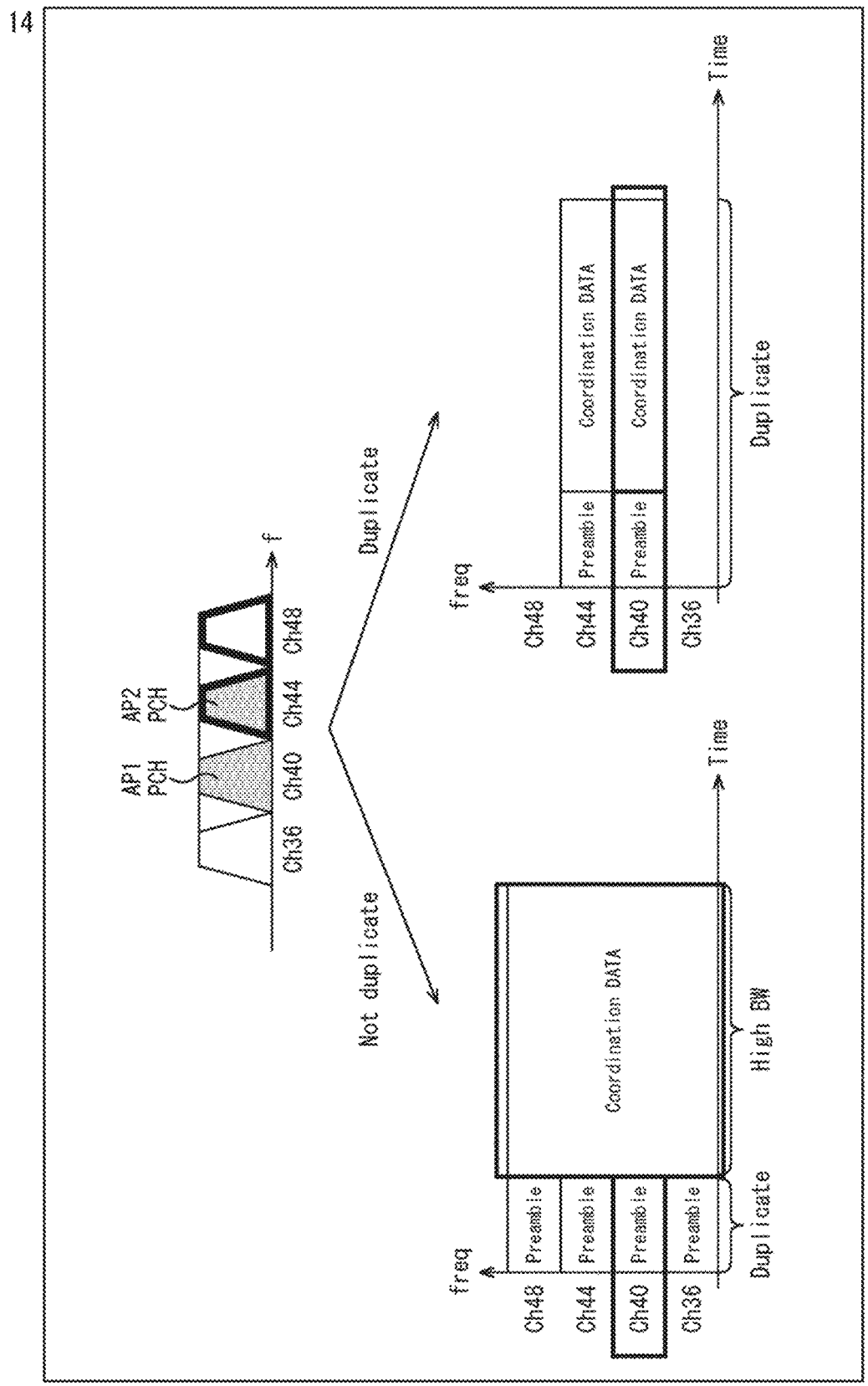
FIG. 14 is a diagram showing a third example of an effect in the first embodiment of the present technology.

FIG. 14 is a diagram showing a third example of the effects in the first embodiment of the present technology.

FIG. 14 shows an example of an operation in which data for coordination (Coordination DATA in FIG. 14) is transmitted from the AP2 to the AP1. Meanwhile, the data for coordination mentioned here is both a control signal for coordination communication and preliminary data sharing for transmitting the same data. Description will be given in order from the top in the drawing.

In a case where the AP1 sets Ch40 to be a PCH and the AP2 sets Ch44 to be a PCH, the AP2 selects whether to transmit data for coordination with a wide bandwidth or whether to duplicate and transmit data, and transmits the data for coordination to the AP1.

In a case where data for coordination is transmitted with a wide bandwidth (in a case where data for coordination is not duplicated), the AP2 duplicates only Preamble as shown on a lower left side in FIG. 14. The AP1 receives the Preamble transmitted by Ch40 and thus understands that the subsequent signals are set to be in a wide bandwidth (High BW), and can acquire data for coordination. In addition, a subordinate STA of the AP2 can provide a transmission suppression period by receiving the Preamble transmitted from the AP2 to the AP1 by Ch44. This can be realized by the existing method of generating a wide bandwidth signal.

On the other hand, in a case where data for coordination is duplicated and transmitted (in a case where Preamble and data for coordination duplicated and transmitted), the AP2 generates and transmits the exact same signal (Preamble+data for coordination) in Ch40 and Ch44 as one orthogonal frequency division multiplexing (OFDM) signal as shown on the lower right side in FIG. 14. The AP1 can acquire data for coordination by receiving the Preamble transmitted by Ch40. In addition, a subordinate STA of the AP2 can provide a transmission suppression period by receiving the Preamble transmitted from the AP2 to the AP1 by Ch44.

Meanwhile, in a case where data for coordination is transmitted by widening the bandwidth of the data, it is possible to use the existing signal generation method as it is and increase a transmission rate of the data for coordination.

However, power received by the AP1 is reduced by widening the bandwidth of a signal, and thus there is a concern that the quality of reception may deteriorate. In particular, in the example of FIG. 14, transmission with a bandwidth of 40 MHz of Ch40/44 is not permitted on the basis of the standard, and thus it is necessary to perform transmission with a bandwidth of 80 MHz.

On the other hand, in a case where data for coordination is duplicated and transmitted, the AP2 can transmit the data with a minimum transmission bandwidth (in the case of FIG. 14, a bandwidth of 40 MHz), but the data for coordination has to be transmitted with a minimum channel width (20 MHz). In this manner, the above-described communication method between two APs has advantages and disadvantages, and it is desirable that either the AP1 or the AP2 can select an optimal transmission method on the basis of its own Capability information and communication quality between APs. Naturally, only one of the methods may be designated on the basis of the standard.

Meanwhile, information of a channel and a bandwidth used for the above-described communication between APs is notified by the "Coordination Frame CH/BW" of the Coordination Request Frame described above with reference to FIG. 9. In addition, a flag which is transmission method information regarding whether to achieve a wide bandwidth or perform duplication is notified by the "Coordination Frame Duplicate Info." of the same Frame.

Modification Example: Example of Overall Processing Sequence

Figure 15:
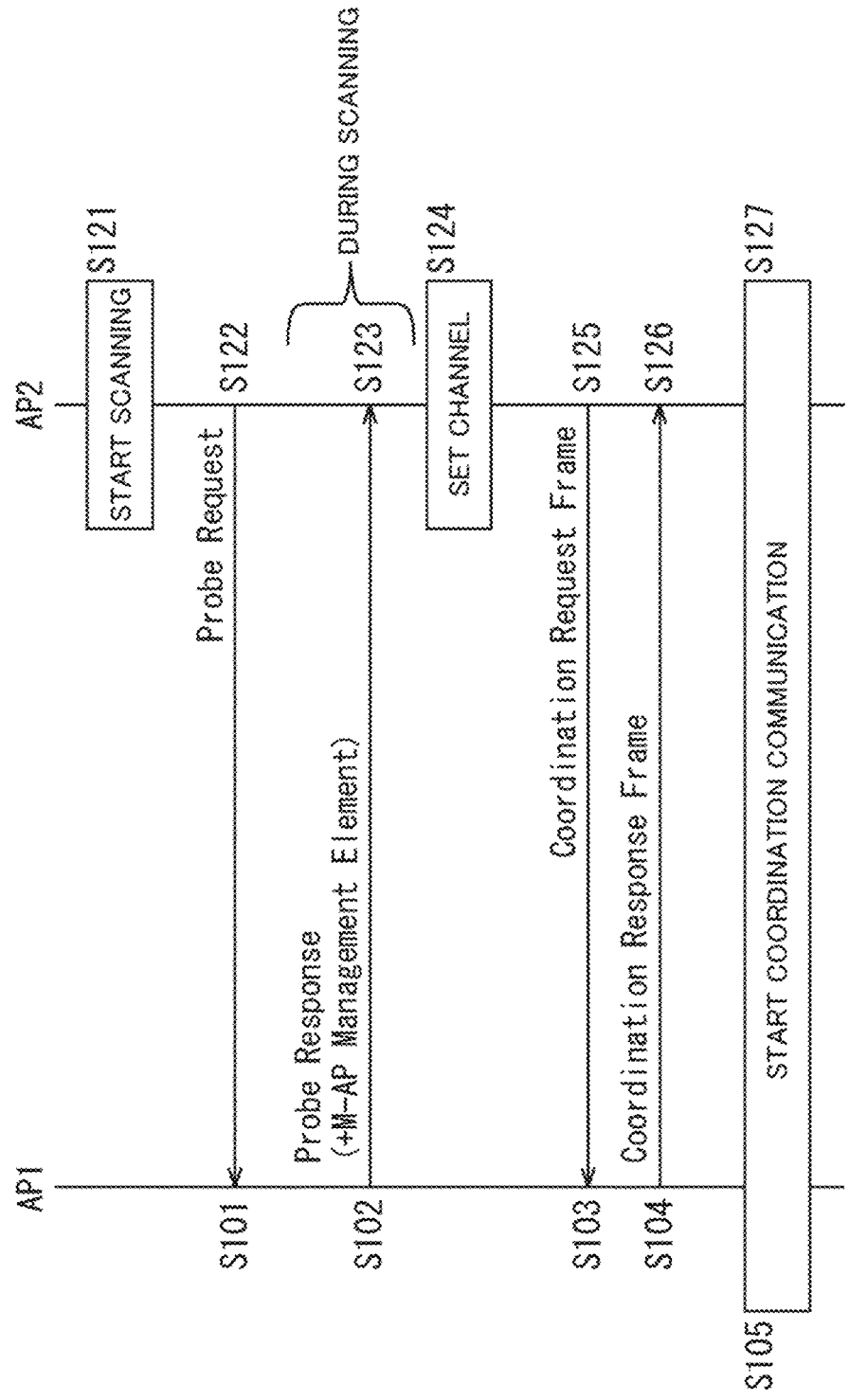
FIG. 15 is a diagram showing a modification example of a sequence for describing the overall processing of a wireless communication system.

FIG. 15 is a diagram showing a modification example of a sequence for describing the overall processing of the wireless communication system.

In step S121, the AP2 starts channel scanning. In step S122, the AP2 transmits a Probe Request Frame. In steps S122 to S124, it is indicated that the AP2 is performed scanning.

In step S101, the AP1 receives a Probe Request Frame transmitted from the AP2. In step S102, the AP1 includes information indicating a coordination recommendation channel in an M-AP Management Element and transmits the information along with the Probe Response Frame.

In step 123 during scanning, the AP2 sets its own PCH on the basis of the information indicating the coordination recommendation channel included in the M-AP Management Element of the Probe Response Frame transmitted from the AP1, and scanning results of the other channels.

In step S125, the AP2 transmits a Coordination Request Frame to the AP1 in a case where the AP2 desires to perform coordination communication with the AP1.

In step S103, the AP1 receives the Coordination Request Frame transmitted from the AP2. In step S104, the AP1 transmits a Coordination Response Frame to the AP2.

In step S126, the AP2 receives the Coordination Response Frame transmitted from the AP1.

In step S127, the AP2 starts coordination communication. In response to this, the AP1 also starts coordination communication in step S105.

FIG. 15 is different from the example of the Beacon signal shown in FIG. 7 in that the AP2 transmits a Probe Request Frame for searching for the surrounding APs and the AP1 transmits a Probe Response including an M-AP Management Element in response to the Probe Request Frame.

That is, the AP1 may insert an M-AP Management Element into a Beacon signal which is a notification signal as shown in FIG. 7, or may insert an M-AP Management Element into a response signal with respect to a request signal for another AP as shown in FIG. 15. That is, the AP1 can insert an M-AP Management Element into a signal used for channel scanning and transmit the signal.

Meanwhile, for the Coordination Request/Response Frames, it is not necessary to prepare a new Frame Formant as a standard. In addition, for example, necessary information (a field of Multi-AP Channel Coordination Info./Common Multi-AP Coordination Info.) may be included not only in the Coordination Request/Response Frames but also in Authentication Request/Response Frames which are frames for connection authentication used between an AP and an STA.

In addition, hereinafter, a case where an M-AP Management Element is included in a Beacon signal will be described as an example, but a form in the case of FIG. 15 (Probe Request Frame) may be used.

4. Second Embodiment (Case where Request for Changing PCH is Performed Between APs)

Next, as a second embodiment, description will be given of an example in which an AP1 transmits information indicating a coordination recommendation channel for performing coordination communication to an AP2, and the AP2 also requests the AP1 to switch a PCH.

<Example of Overall Processing Sequence>

Figure 16:
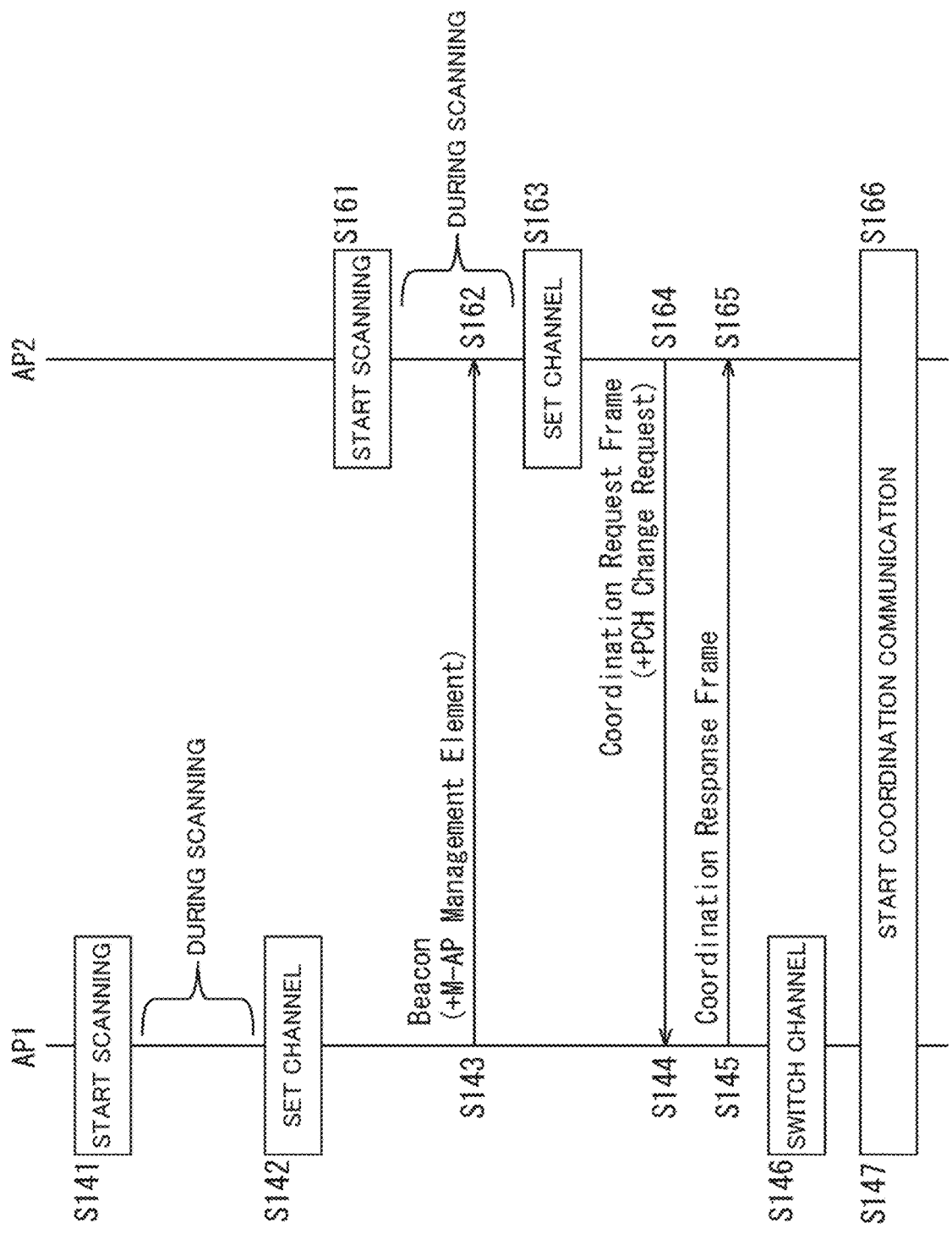
FIG. 16 is a diagram showing a sequence for describing the overall processing of a wireless communication system according to a second embodiment of the present technology.

FIG. 16 is a diagram showing a sequence for describing the overall processing of a wireless communication system.

In step S141, the AP1 starts channel scanning for performing channel setting. In steps S141 to S142, it is indicated that the AP1 is performing scanning.

In step S142, the AP1 sets an empty channel as a PCH. In addition, the AP1 determines a coordination recommendation channel for of another AP (AP2) that can perform coordination communication with the AP1 on the basis of a bandwidth that the AP1 requests (desires) (Requirement BW).

In step S143, the AP1 includes information indicating the determined coordination recommendation channel in an M-AP Management Element and transmits the information along with a Beacon signal.

On the other hand, the AP2 starts channel scanning in step 161. In steps S161 to S163, it is indicated that the AP2 is performing scanning.

In step S162, the AP2 receives the M-AP Management Element included in the Beacon signal transmitted from the AP1.

In step S163, the AP2 sets its own PCH on the basis of information indicating the coordination recommendation channel included in the M-AP Management Element and channel scanning results. In this case, the AP2 generates (PCH Change Request Info.) including channel switching request information for requesting the switching of the PCH of the AP1. Examples of a channel for which switching is requested include any one of secondary channels of the AP2, and the like.

In step S164, the AP2 transmits a Coordination Request Frame including channel switching request information to the AP1 in a case where the AP2 desires to perform coordination communication with the AP1.

In step S144, the AP1 receives the Coordination Request Frame transmitted from the AP2. The AP1 determines whether to switch a channel on the basis of the channel switching request information included in the Coordination Request Frame. In step S145, the AP1 transmits a Coordination Response Frame including a channel switching result to the AP2. In step S146, the AP1 switches a PCH on the basis of a determination result of channel switching.

In step S165, the AP2 receives the Coordination Response Frame transmitted from the AP1.

In step S166, the AP2 starts coordination communication. In response to this, the AP1 also starts coordination communication in step S147.

FIG. 16 is different from FIG. 7 in that the AP2 determines its own PCH on the basis of a channel scanning result and then transmits a Coordination Request Frame including PCH Change Request Info. for requesting PCH switching of the AP1. In addition, there is a difference therebetween in that the AP1 transmits a Coordination Response Frame including a channel switching result on the basis of the above-described PCH Change Request Info. and performs channel switching.

Meanwhile, the AP1 may determine channel switching on the basis of request contents and its own state and may not perform channel switching in response to a determination result. In this case, the AP2 may perform channel switching after receiving the Coordination Response Frame.

<Configuration Example of Coordination Request Frame>

Figure 17:
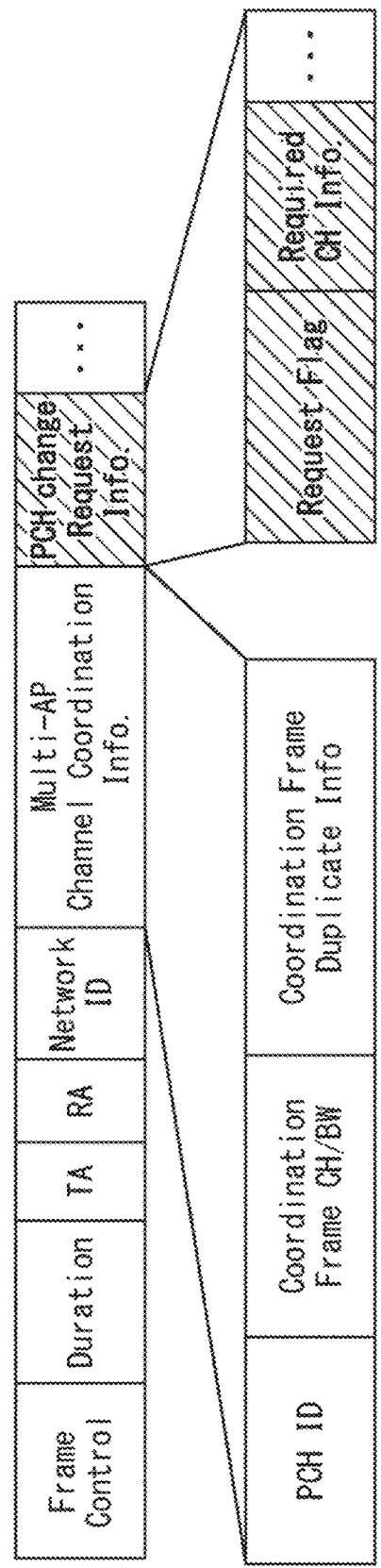
FIG. 17 is a diagram showing a configuration example of a Coordination Request Frame.

FIG. 17 is a diagram showing a configuration example of a Coordination Request Frame.

The Coordination Request Frame is configured to include fields such as Frame Control, a Duration, a TA, an RA, a Network ID, Multi-AP Channel Setup Info., and PCH Change Request Info.

A configuration shown in FIG. 17 is different from the configuration shown in FIG. 9 in that the field of the PCH Change Request Info. is included.

The field of the PCH Change Request Info. includes channel switching request information for requesting the switching of a PCH of an AP.

The field of the PCH Change Request Info. includes a Request Flag and Required CH Info.

The Request Flag is a flag indicating whether or not to request PCH switching.

The Required CH Info. is information indicating a channel for which switching is requested. There may be a plurality of pieces of Required CH Info.

<Configuration Example of Coordination Response Frame>

Figure 18:
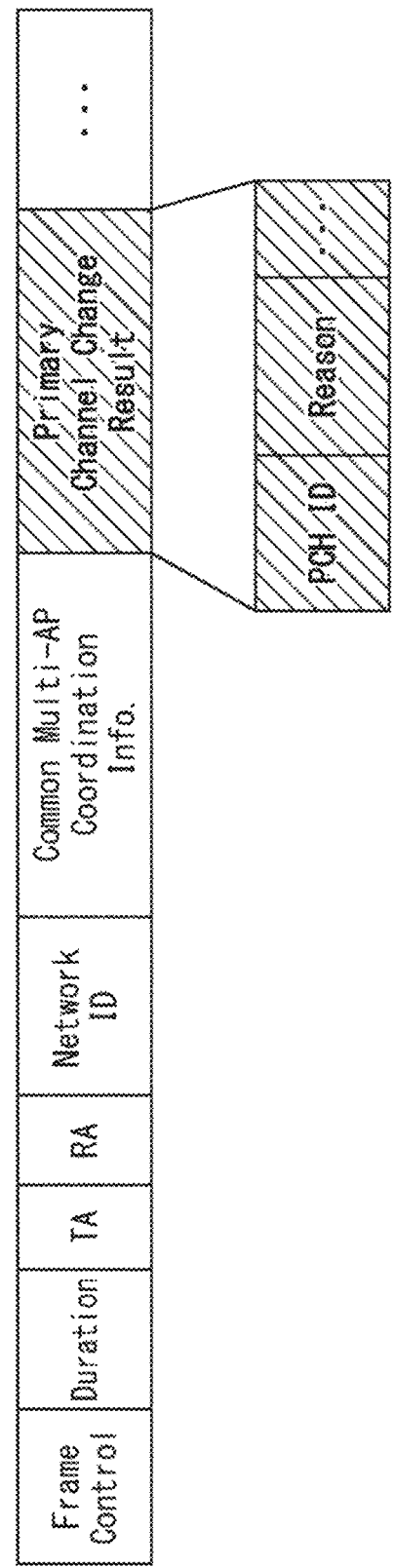
FIG. 18 is a diagram showing a configuration example of a Coordination Response Frame.

FIG. 18 is a diagram showing a configuration example of a Coordination Response Frame.

The Coordination Response Frame is configured to include fields such as Frame Control, a Duration, a TA, an RA, a Network ID, Common Multi-AP Coordination Info., and a Primary Channel Change Result.

A configuration shown in FIG. 18 is different from the configuration shown in FIG. 10 in that the field of the Primary Channel Change Result is added.

The field of the Primary Channel Change Result includes a result of a PCH switching request included in a Request.

The field of the Primary Channel Change Result includes a PCH ID and a Reason.

The PCH ID is an identifier indicating a PCH after switching. Meanwhile, in a case where switching is not performed, a PCH identifier which is currently set is included.

The Reason is information on a PCH switching result (Success/Fault) and the reason why switching has not been performed.

<Channel Setting Operation>

Figure 19:
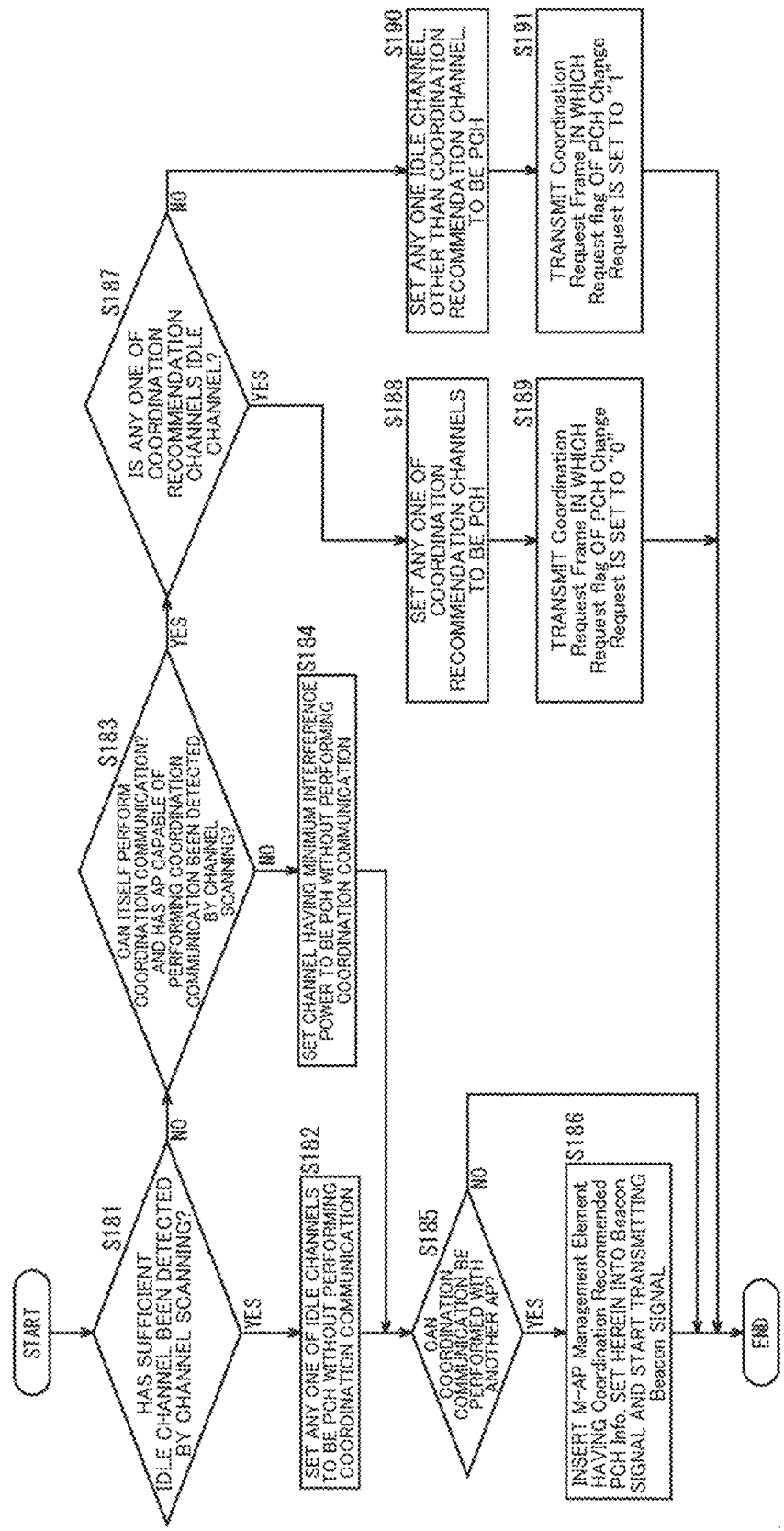
FIG. 19 is a flowchart showing channel setting processing of an AP.

FIG. 19 is a flowchart showing channel setting processing of an AP.

Similarly to the case of FIG. 11, FIG. 19 shows processing, which is common to the AP1 and the AP2, for setting their own PCHs on the basis of channel scanning results.

Meanwhile, the processes of steps S181 to S186 are similar to the processes of steps S51 to S53 and steps S55 to S57 in FIG. 11, and the description thereof will be omitted as appropriate.

Similarly to the process of step S54 in FIG. 11, it is determined in step S187 whether or not any one of coordination recommendation channels is an idle channel. In a case where it is determined that any one of coordination recommendation channels is an idle channel, the processing proceeds to step S188.

Similarly to the process of step S58 in FIG. 11, in step S188, an AP sets any one channel which is a coordination recommendation channel and an idle channel to be its own PCH.

In step S189, the AP transmits a Coordination Request Frame in which a Request flag of a PCH Change Request is set to "0" to a transmitter of a Beacon signal.

On the other hand, in a case where it is determined in step S187 that none of coordination recommendation channels is an idle channel, the processing proceeds to step S190.

In step S190, the AP sets ant one idle channel other than the coordination recommendation channels to be a PCH. Meanwhile, the process of step S190 corresponds to the process of step S163 of the AP2 in FIG. 16.

In step S191, the AP transmits a Coordination Request Frame in which a Request flag of a PCH Change Request is set to "1" to a transmitter of a Beacon signal. Meanwhile, the process of step S191 corresponds to the process of step S164 of the AP2 in FIG. 16.

After steps S189 and S191, the channel setting processing is terminated.

FIG. 19 is different from FIG. 11 in that, in a case where an AP detects an AP capable of performing coordination communication during channel scanning, and a coordination recommendation channel is not an idle channel, the AP capable of performing coordination communication is requested to perform PCH switching. Specifically, there is a difference in that the AP includes information for requesting PCH switching in PCH Change Request Info. and transmits a Coordination Request Frame to the AP capable of performing coordination communication.

Effects of Second Embodiment

Figure 20:
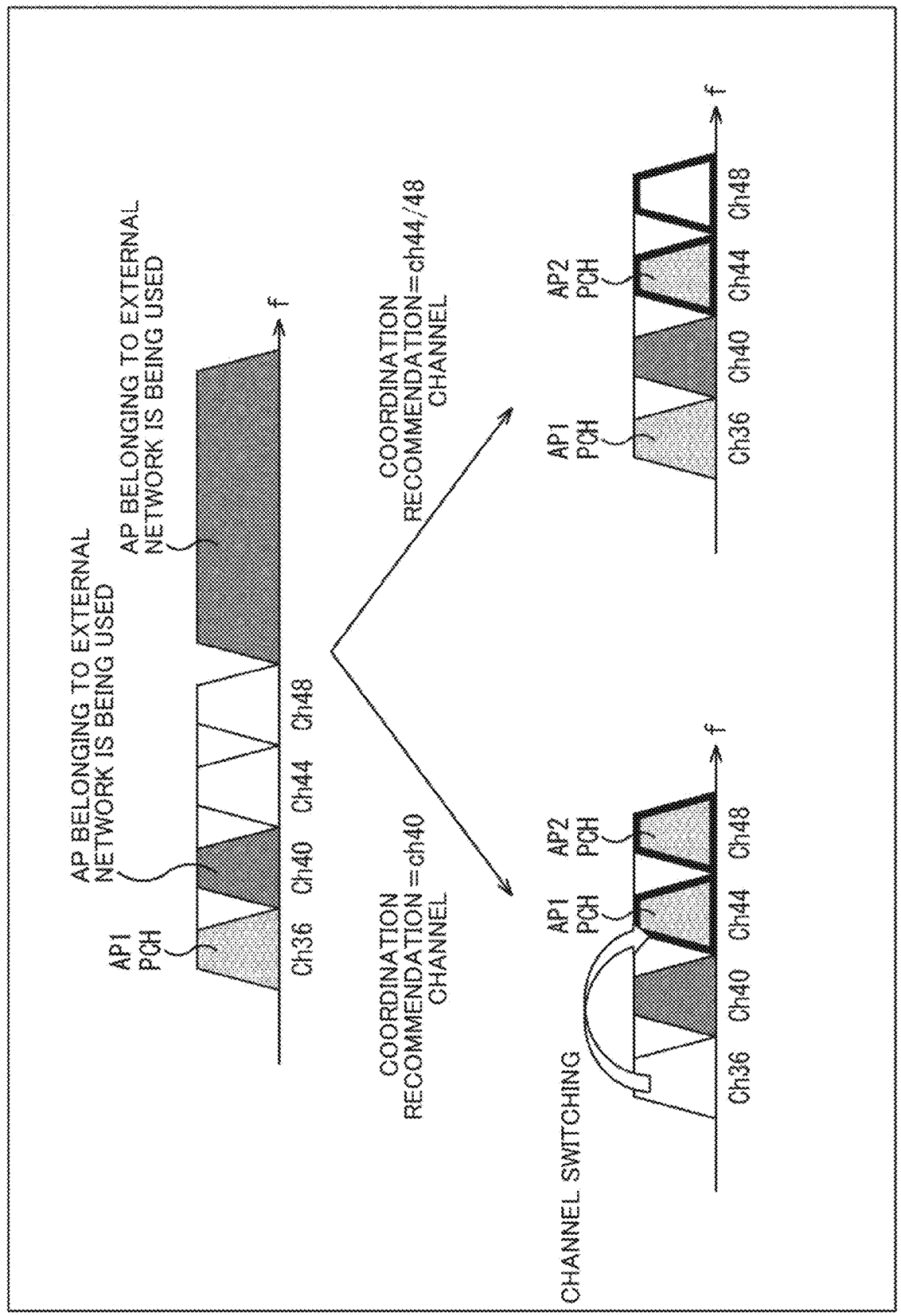
FIG. 20 is a diagram showing an example of an effect in the second embodiment of the present technology.

FIG. 20 is a diagram showing effects in the second embodiment of the present technology.

FIG. 20 shows an example of an operation in which the AP2 sets its own PCH on the basis of its own channel scanning result and requesting PCH switching from the AP1. Description will be given in order from the top in the drawing.

It is assumed that the AP1 has detected that Ch36/44/48 are idle channels and the other channels (for example, Ch40, Ch52/56/60/64 and the like) are being used by APs that belong to an external network (that is, APs that cannot perform coordination communication), on the basis of channel scanning results.

It is assumed that the AP2 has detected that Ch44/48 are idle channels. Ch36 is being used by the AP1, and the other channels (for example, Ch40, Ch52/56/60/64 and the like) are being used by APs that belong to an external network (that is, APs that cannot perform coordination communication), on the basis of channel scanning results.

In this case, the AP2 understands that the AP1 can perform coordination communication from the M-AP Management Element included in the Beacon signal transmitted from the AP1, and confirms a coordination recommendation channel of the AP1 which is designated by the same Element.

However, in a case where the coordination recommendation channel designated by the AP1 is already in use (in the case of FIG. 20. Ch40), the AP2 sets Ch48 to be a PCH as shown on a lower left side in FIG. 20 and requests that the PCH of the AP1 is switched to Ch44.

In a case where the AP1 can respond to this request, the AP1 and the AP2 avoid channels in use and set adjacent channels to their respective PCHs. Thereby, it is possible to perform communication of data for coordination by the method described above with reference to FIG. 14.

Meanwhile, in a case where the coordination recommendation channels transmitted from the AP1 are Ch44/48, the AP2 can set any one of Ch44/48 to be PCH in a similar manner to the first embodiment without requesting PCH switching as shown on a lower right side in FIG. 20.

5. Third Embodiment (Case where there is Controller)

Next, as a third embodiment, an example in which there is a controller that can intensively control an AP1 and an AP2 will be described.

<Configuration Example of Wireless Communication System>

Figure 21:
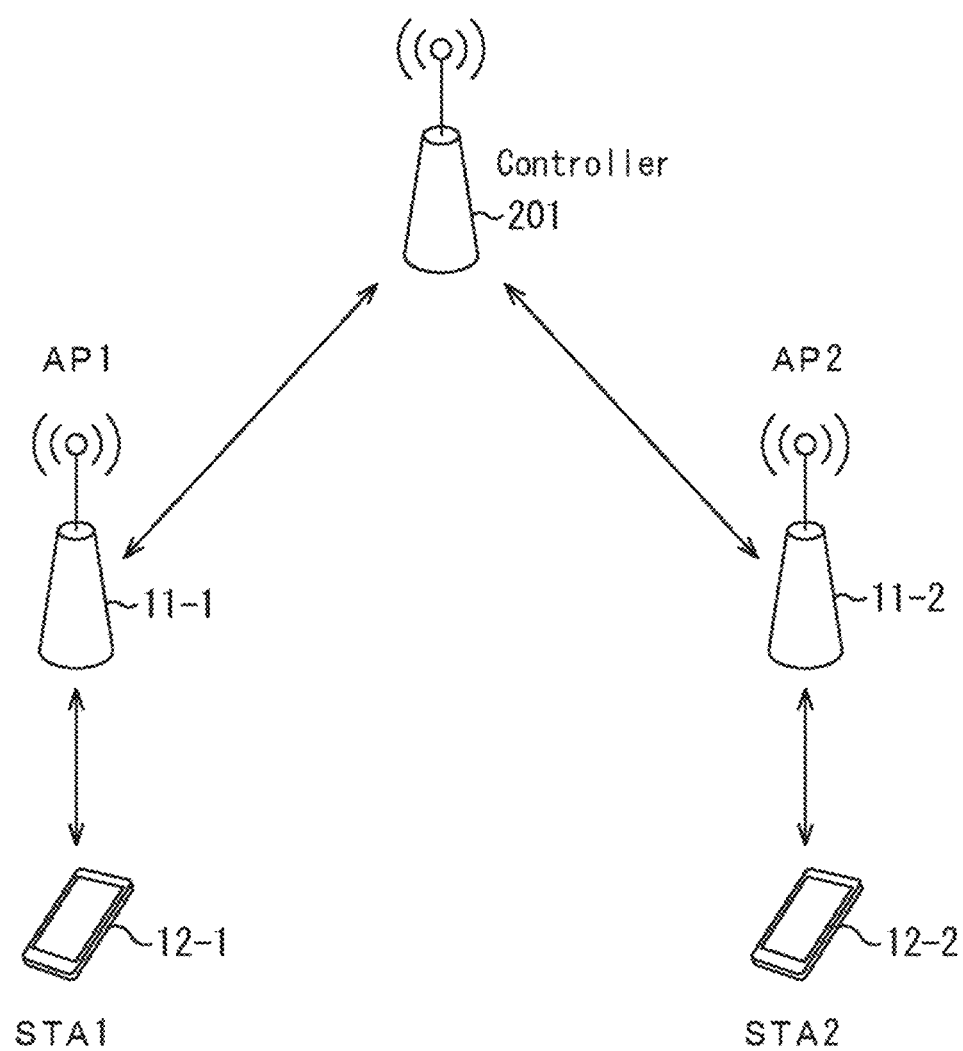
FIG. 21 is a diagram showing a configuration example of a wireless communication system according to a third embodiment of the present technology.

FIG. 21 is a diagram showing a configuration example of a wireless communication system according to the third embodiment of the present technology.

The wireless communication system in FIG. 21 is different from the wireless communication system in FIG. 5 in that the AP1 and the AP2 performs communication of data for coordination through a controller that intensively controls the AP1 and the AP2 without directly performing communication.

The wireless communication system in FIG. 21 is configured such that the controller is connected to the AP1 and the AP2 through wired communication or wireless communication. In addition, similar to the wireless communication system in FIG. 5, the wireless communication system is configured such that an STA1 is connected to the AP1 through, and an STA2 is connected to the AP2 through wireless communication.

For example, the controller is constituted by a wireless communication device 201 having the same configuration as that of the wireless communication device 11. Since the configuration of the wireless communication device 201 is basically the same as that of the wireless communication device 11, the configuration of the wireless communication device 11 in FIG. 6 will be used later in the description of the wireless communication device 201. In this case, a communication control unit 31 performs, for example, the generation of control information to be transmitted to an AP to be intensively controlled and the selection of an optimum PCH for coordination.

Meanwhile, the controller is only required to be a device having a function characterized by the present technology, and may be the wireless communication device 201 or may be a dedicated intensive control device such as Automatic Frequency Control (AFC).

Meanwhile, a target system configuration is not limited to the example shown in FIG. 21, and any configuration may be adopted as long as there are a plurality of APs having established connection and STAs are connected to the respective APs as surrounding terminals, similar to the case of FIG. 5.

<Example of Overall Processing Sequence>

Figure 22:
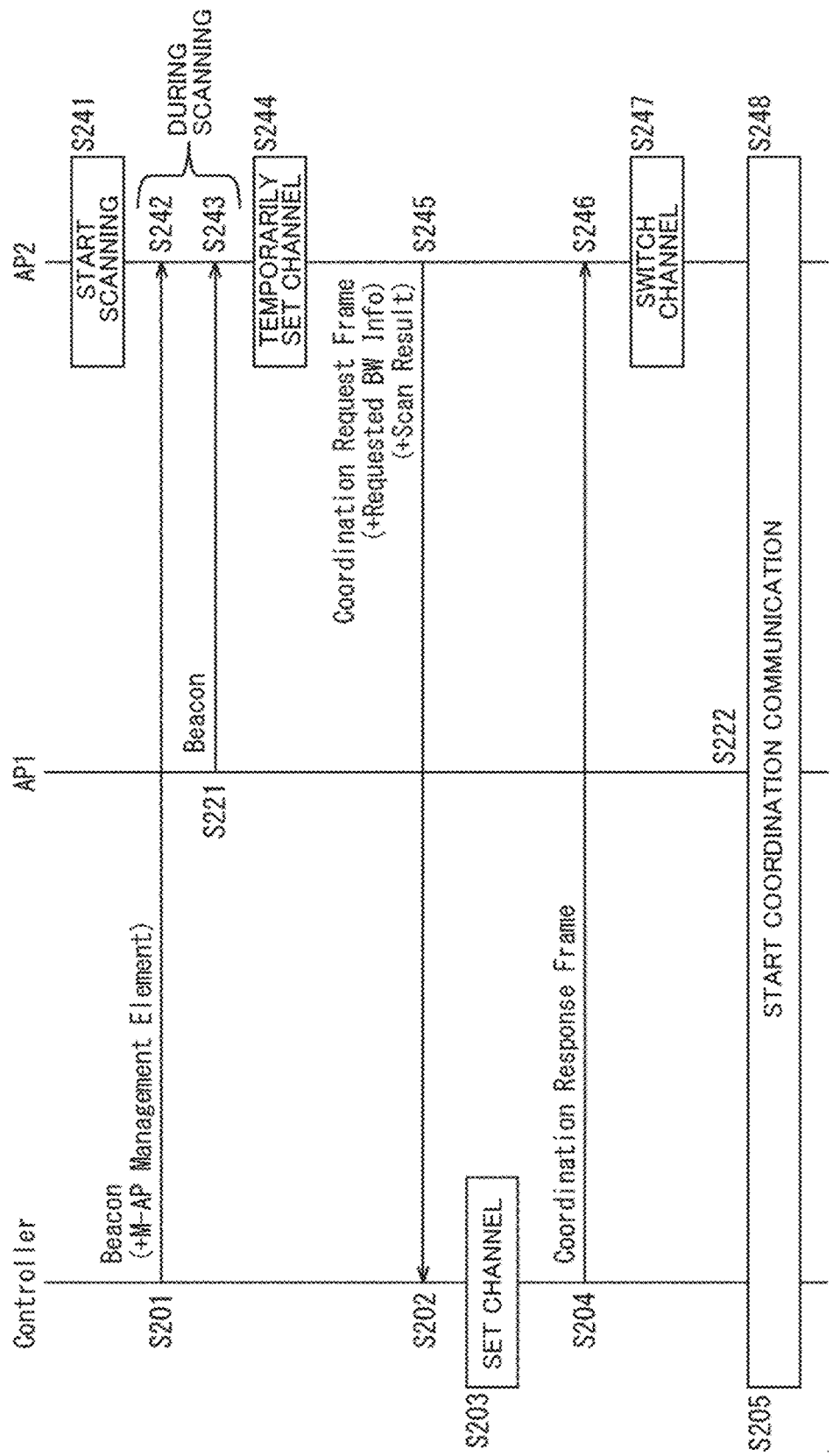
FIG. 22 is a diagram showing a sequence for describing the overall processing of the wireless communication system.

FIG. 22 is a diagram showing a sequence for describing the overall processing of the wireless communication system.

In FIG. 22, the AP1 has already terminated the processing with the controller and is in a state where the AP1 waits to start coordination communication with the controller, and processing between the controller and the AP2 is mainly shown.

In step S241, the AP2 starts channel scanning for performing channel setting. In steps S241 to S244, it is indicated that the AP2 is performed scanning.

In step S201, the controller transmits a Beacon signal including an M-AP Management Element. In step S221, the AP1 transmits the Beacon signal.

The AP2 receives the Beacon signal transmitted by the controller in step S242 during the scanning. The AP2 receives the Beacon signal transmitted by the AP1 in step S243 during the scanning. Meanwhile, the AP2 may be positioned at a location where the Beacon signal transmitted by the AP1 cannot be received.

When the channel scanning is terminated, the AP2 performs channel temporary setting in step S244 in a case where the AP2 could receive the Beacon signal transmitted by the controller. That is, the AP2 performs temporary setting of a channel capable of communicating with the controller (for example, a channel which is set to be a PCH by the Controller) to be a PCH.

In step S245, the AP2 transmits a Coordination Request Frame to the Controller. Meanwhile, in this case, the AP2 notifies the controller of the Coordination Request Frame, inclusive of Requested BW Info. which is its desired bandwidth and a scanning result (Scan Result).

The controller receives the Coordination Request Frame from the AP2 in step S202 and determines an optimal PCH of the AP2 in step S203.

In step S204, the controller transmits a Coordination Response Frame including information indicating an optimal PCH.

The AP2 receives the Coordination Response Frame transmitted from the controller in step S246, and switches a PCH in step S247.

In step S248, the AP2 starts coordination communication. In response to this, the controller also starts coordination communication in step S205, and the AP1 also starts coordination communication in step S222.

Meanwhile, the AP1 can also receive the Coordination Response Frame transmitted from the controller to switch its own PCH similar to the AP2.

<Example of Frame Configuration of M-AP Management Element>

Figure 23:
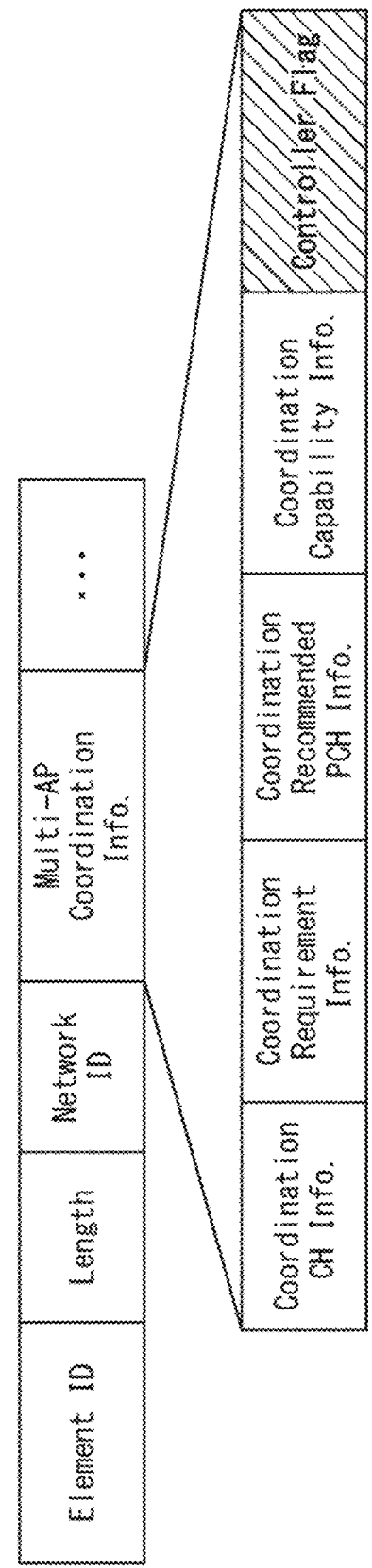
FIG. 23 is a diagram showing an example of a frame configuration of an M-AP Management Element.

FIG. 23 is a diagram showing an example of a frame configuration of an M-AP Management Element.

A frame of the M-AP Management Element in FIG. 23 is different from the frame of the M-AP Management Element in FIG. 8 in that a Controller Flag is added to Multi-AP Coordination Info.

The Controller Flag is information for making it possible to determine whether or not a transmitter is a controller even when another AP has temporarily transmitted a signal including the same Element.

<Configuration Example of Coordination Request Frame>

Figure 24:
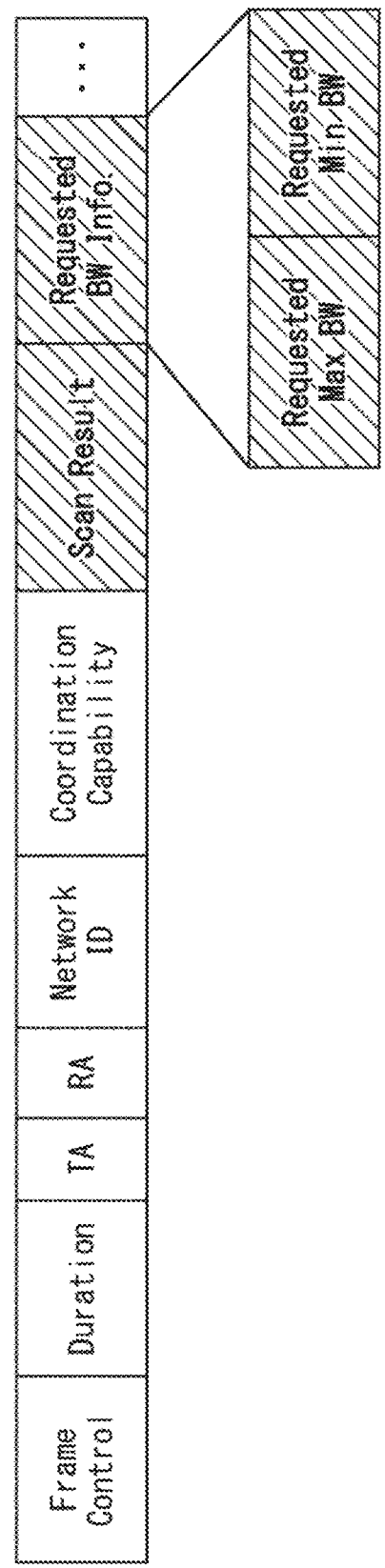
FIG. 24 is a diagram showing a configuration example of a Coordination Request Frame.

FIG. 24 is a diagram showing a configuration example of a Coordination Request Frame.

The Coordination Request Frame is configured to include fields such as Frame Control, a Duration, a TA, an RA, a Network ID, Coordination Capability Info., a Scan Result, and Requested BW Info.

The Coordination Request Frame in FIG. 24 is different from the Multi-AP Coordination Info. in FIG. 9 in that a field of Multi-AP Channel Coordination Info. is removed. In addition, the Coordination Request Frame in FIG. 24 is different from the Multi-AP Coordination Info. in FIG. 9 in that the field of the Coordination Capability Info. in FIG. 8 is added, and fields of a Scan Result and Requested BW Info. are added.

The field of the Scan Result includes information indicating a result of channel scanning performed. The type of information is not particularly limited, and the information may be a maximum received power observed in each channel or may be a flag indicating whether or not each channel is empty. In addition, information obtained by demodulating a received signal, such as transmission destination information of an observed frame, may be included.

The field of the Requested BW Info. includes a Requested Max BW and a Requested Min BW.

The Requested Max BW is information on a maximum bandwidth requested (desired) by a transmitter. The Requested Min BW is information on a minimum bandwidth desired by a transmitter.

The controller determines a PCH of the AP1 or the AP2 on the basis of these information.

<Configuration Example of Coordination Response Frame>

Figure 25:
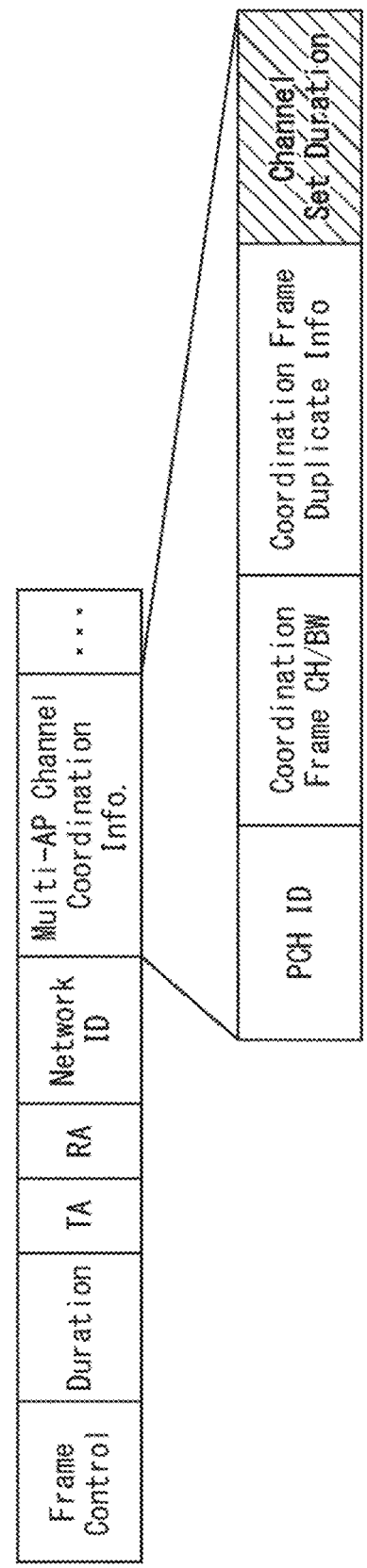
FIG. 25 is a diagram showing a configuration example of a Coordination Response Frame.

FIG. 25 is a diagram showing a configuration example of a Coordination Response Frame.

A Coordination Request Frame in FIG. 25 is different from the Multi-AP Coordination Info. in FIG. 10 in that a field of Common Multi-AP Coordination Info. is removed and the field of the Multi-AP channel Coordination Info. described above with reference to FIG. 9 is added.

Multi-AP channel Coordination Info. in FIG. 25 is different from the Multi-AP Coordination Info. in FIG. 9 in that a Channel Set Duration is added.

The Channel Set Duration is information indicating a fixed period for the controller to perform control so that the AP1/AP2 acquire a Beacon signal transmitted by the controller again after the fixed period has elapsed at the time of designating a channel other than a secondary channel of a PCH set by the controller.

<Channel Setting Operation of AP>

Figure 26:
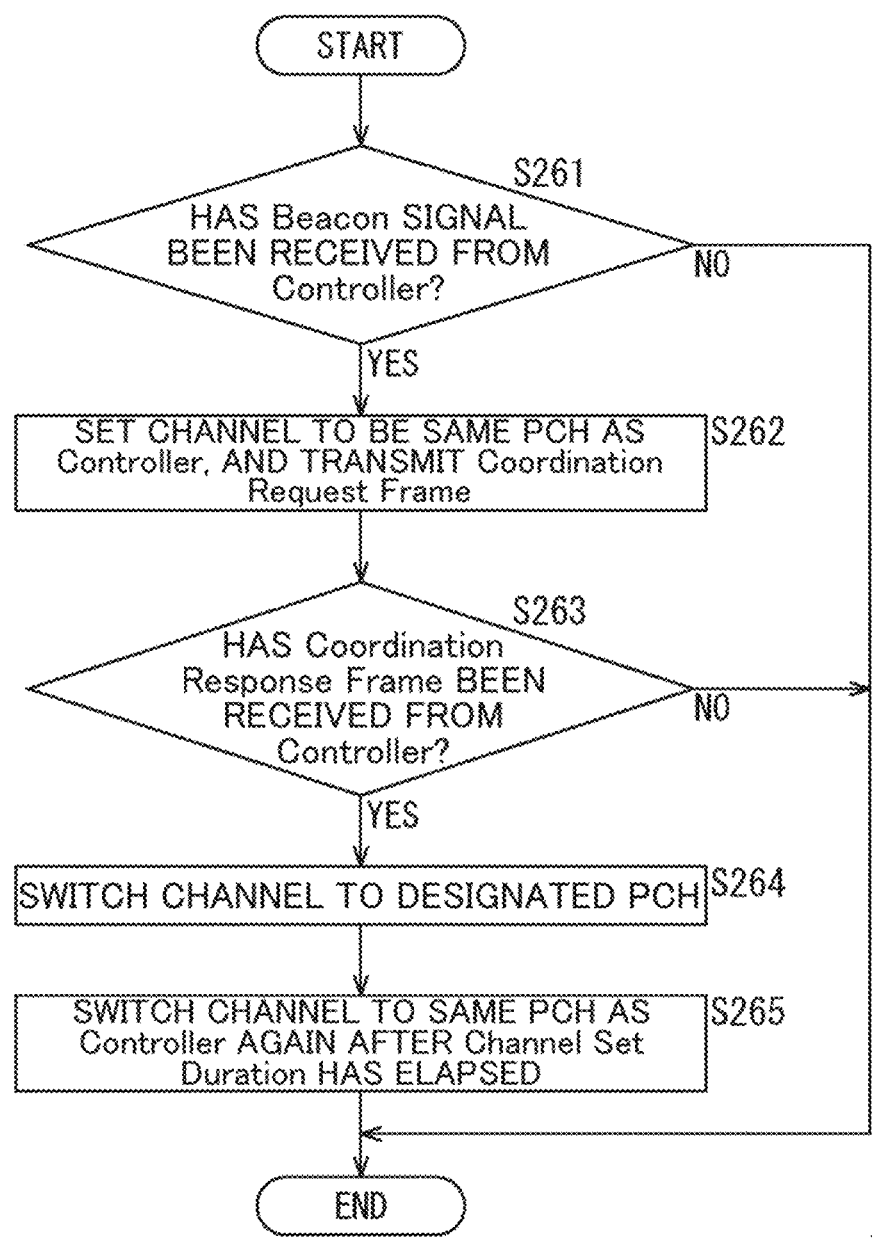
FIG. 26 is a flowchart showing channel setting processing of an AP.

FIG. 26 is a flowchart showing channel setting processing of an AP.

FIG. 26 processing, which is common to the AP1 and the AP2, for setting its own PCH on the basis of information transmitted by the controller.

In step S261, the communication control unit 31 of the AP determines whether or not a Beacon signal has been received from the controller.

In a case where it is determined in step S261 that the Beacon signal has been received from the controller, the processing proceeds to step S262.

In step S262, the communication control unit 31 sets a channel to be the same PCH as the controller and causes a wireless transmission unit 42 to transmit a Coordination Request frame.

In step S263, the communication control unit 31 determines whether or not a Coordination Response Frame has been received from the controller.

In a case where it is determined in step S263 that the Coordination Response Frame has been received from the controller, the processing proceeds to step S264.

In step S264, the communication control unit 31 switches a channel to a PCH designated by the Coordination Response Frame.

In step S265, the communication control unit 31 switches a channel to the same PCH as the controller after a Channel Set Duration has elapsed. Thereafter, the channel setting processing is terminated.

In a case where it is determined in step S261 that the Beacon signal has not been received from the controller or in a case where it is determined in step S263 that the Coordination Response Frame has not been received from the controller, the channel setting processing is terminated.

<Channel Setting Operation of Controller>

Figure 27:
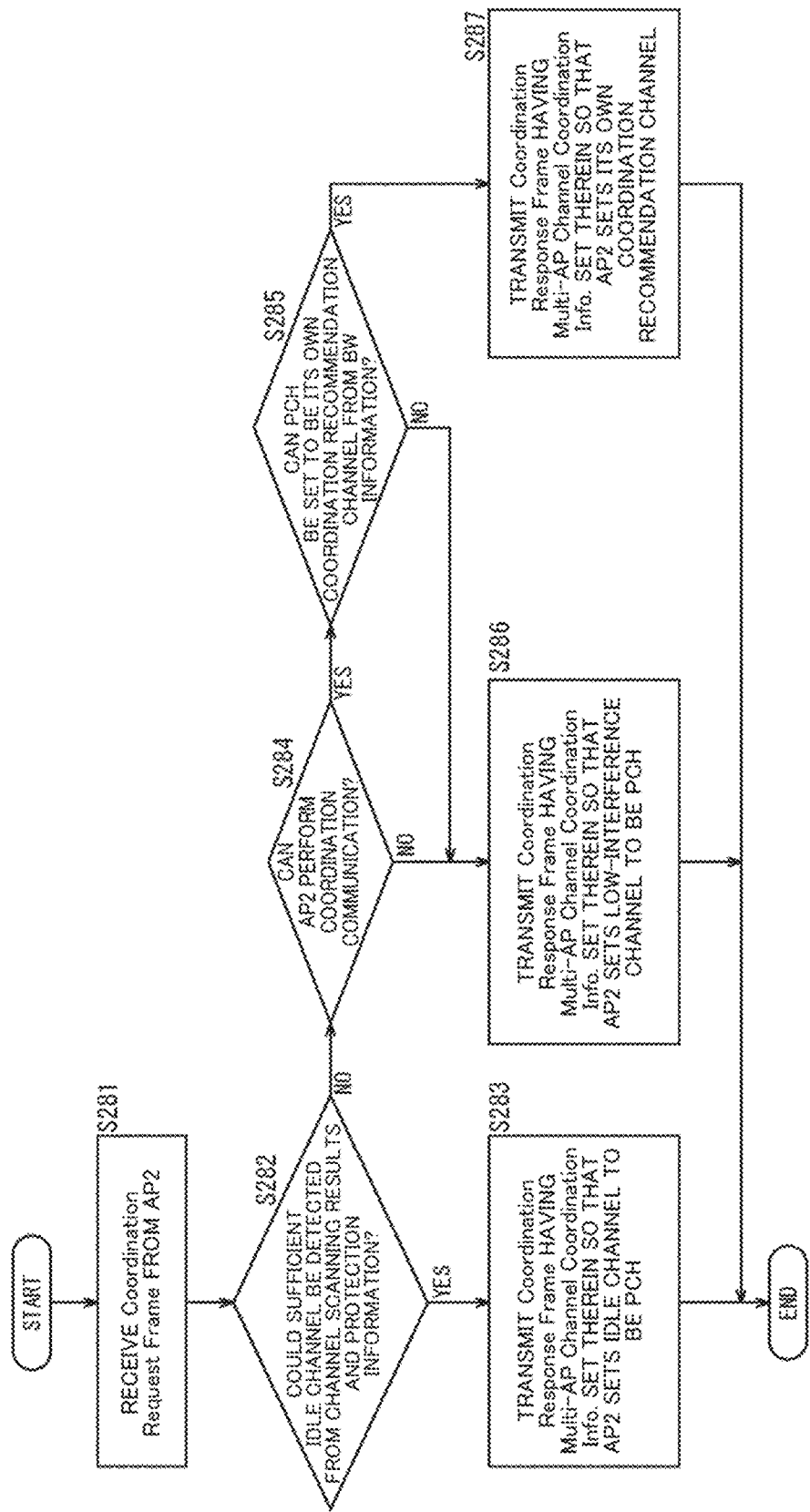
FIG. 27 is a flowchart showing channel setting processing of a Controller.

FIG. 27 is a flowchart showing channel setting processing of the controller.

FIG. 27 shows an example in which the AP2 sets a PCH as shown in FIG. 22. Meanwhile, the same processing is also performed on the AP1.

In step S281, the wireless reception unit 41 of the controller receives a Coordination Request frame rom the AP2.

In step S282, the communication control unit 31 determines whether or not a sufficient idle channel could be detected on the basis of a channel scanning result and system protection information.

In a case where it is determined in step S282 that a sufficient idle channel could be detected, the processing proceeds to step S283.

In step S283, the communication control unit 31 causes the wireless transmission unit 42 to transmit a Coordination Response Frame having Multi-AP channel Coordination Info. set therein so that the AP2 sets an idle channel to be a PCH. Thereafter, the channel setting processing is terminated.

In a case where it is determined in step S282 that a sufficient idle channel could not be detected, the processing proceeds to step S284.

In step S284, the communication control unit 31 determines whether or not the AP2 can perform coordination communication on the basis of the Coordination Request frame. In a case where it is determined in step S284 that the AP2 can perform coordination communication, the processing proceeds to step S285.

In step S285, the communication control unit 31 determines whether or not a PCH can be set to be its own coordination recommendation channel from BW information (Requested BW Info.) included in the Coordination Request frame.

In a case where it is determined in step S285 that a PCH cannot be set to be its own coordination recommendation channel, the processing proceeds to step 286.

Also in a case where it is determined in step S284 that the AP2 cannot perform coordination communication, the processing proceeds to step S286.

In step S286, the communication control unit 31 causes the wireless transmission unit 42 to transmit the Coordination Response Frame having Multi-AP channel Coordination Info. set therein so that the AP2 sets a low-interference channel to be a PCH. Thereafter, the channel setting processing is terminated.

In a case where it is determined in step S285 that a PCH cannot be set to be its own coordination recommendation channel, the processing proceeds to step S287.

In step S287, the communication control unit 31 causes the wireless transmission unit 42 to transmit the Coordination Response Frame having the Multi-AP channel Coordination Info. set therein so that the AP2 sets a coordination recommendation channel to be a PCH. Thereafter, the channel setting processing is terminated.

Effects of Third Embodiment

Figure 28:
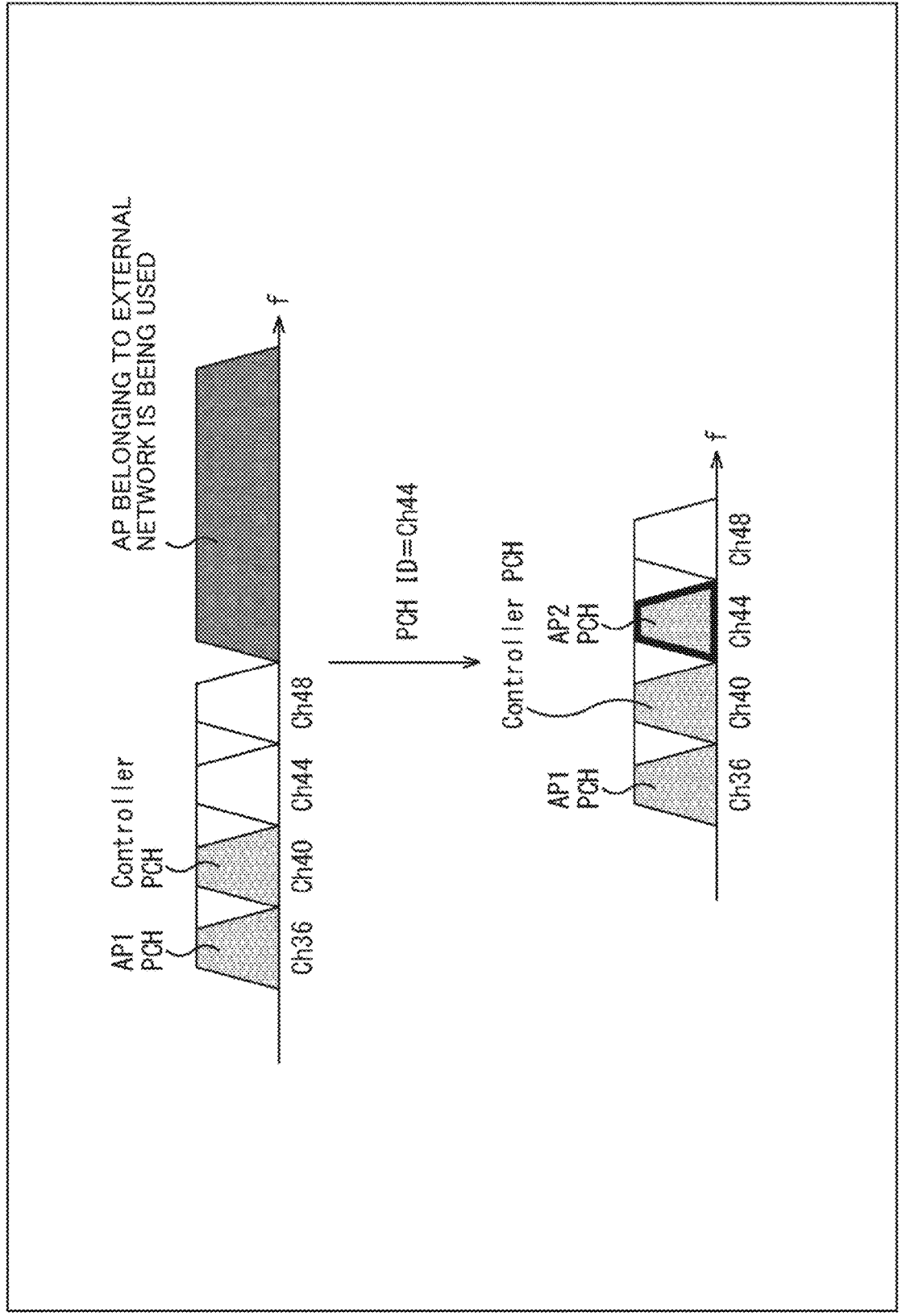
FIG. 28 is a diagram showing an example of an effect in the third embodiment of the present technology.

FIG. 28 is a diagram showing an example of effects in the third embodiment of the present technology.

FIG. 28 shows an example of an operation in which the AP2 sets its own PCH on the basis of a PCH designated by the controller. Description will be given in order from the top in the drawing.

It is assumed that the controller has detected that Ch36 is being used by the AP1, Ch44/48 are idle channels, and the other channels (Ch52/56/60/64 and the like) are being used by APs that belong to an external network, on the basis of the channel scanning results transmitted from the AP1 and the AP2.

The controller transmits a Coordination Response Frame in which Ch44, out of empty Ch44/48, is set to be a PCH ID to the AP2.

The AP2 sets Ch44 to be its own PCH on the basis of PCH ID=Ch44 as shown on a lower side in FIG. 28. Thus, the AP2 can set a channel that can transmit data for coordination to the controller (one of the secondary channels of the controller) to be a PCH.

6. Others

<Effects of the Present Technology>

As described above, according to the present technology, even when an AP using one channel sets different PCHs between a plurality of APs that perform coordination communication, control signals, data signals, or the like can be exchanged between the APs.

In addition, according to the present technology, since one AP gives notice of some of its own secondary channels as coordination recommendation channels, the other AP can set a PCH to be any one of the secondary channels of the one AP. Thereby, the AP1 and the AP2 can set different PCHs and communicate data for coordination between the AP1 and the AP2 without losing the opportunity to acquire a transmission right due to signal collisions or carrier sensing.

Further, in the communication of data for coordination, a transmission method can be selected on the basis of channel conditions between APs and Capability information.

Further, in a case where a sufficient idle channel could be detected, an AP can also be operated without forcing coordination and without interfering with each other using different channels.

<Configuration Example of Computer>

The above-described series of processing can also be performed by hardware or software. When the series of processing is performed by software, a program for the software is embedded in dedicated hardware to be installed from a program recording medium to a computer or a general-purpose personal computer.

Figure 29:
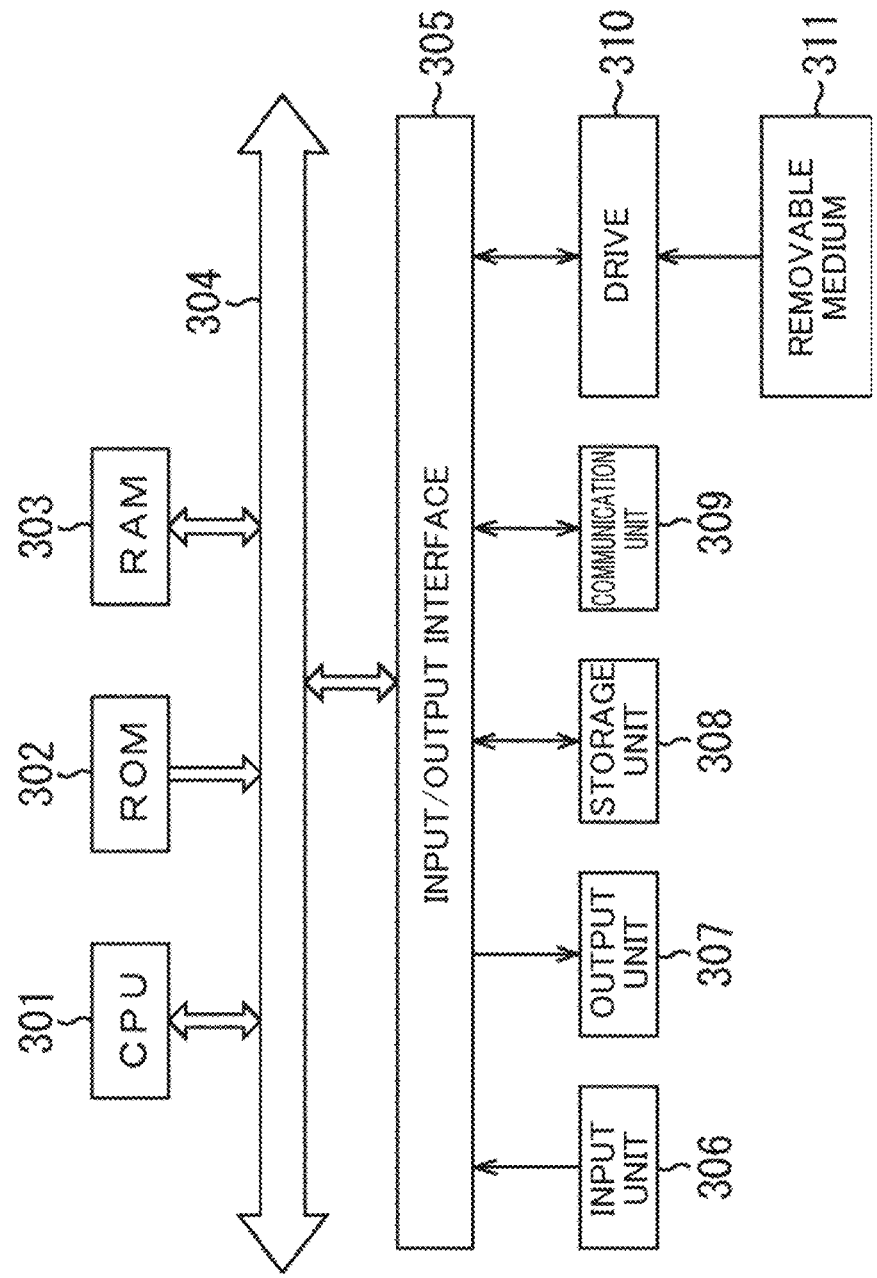
FIG. 29 is a block diagram showing a configuration example of a computer.

FIG. 29 is a block diagram showing a configuration example of hardware of a computer that executes a program to perform the above-described series of processing.

A central processing unit (CPU) 301, a read-only memory (ROM) 302, and a random access memory (RAM) 303 are connected to each other via a bus 304.

An input/output interface 305 is further connected to the bus 304. An input unit 306 including a keyboard and a mouse and an output unit 307 including a display and a speaker are connected to the input/output interface 305. In addition, a storage unit 308 including a hard disk or a nonvolatile memory, a communication unit 309 including a network interface, a drive 310 driving a removable medium 311 are connected to the input/output interface 305.

In the computer that has such a configuration, for example, the CPU 301 loads a program stored in the storage unit 308 to the RAM 303 via the input/output interface 305 and the bus 304 and executes the program to perform the above-described series of processing.

The program executed by the CPU 301 is recorded on, for example, the removable medium 311 or is provided via a wired or wireless transfer medium such as a local area network, the Internet, a digital broadcast to be installed in the storage unit 308.

Meanwhile, the program executed by the computer may be a program that performs processing chronologically in the order described in the present specification or may be a program that performs processing in parallel or at a necessary timing such as a calling time.

Meanwhile, in the present specification, a system is a collection of a plurality of constituent elements (devices, modules (components), or the like) and all the constituent elements may be located or not located in the same casing. Thus, a plurality of devices housed in separate housings and connected via a network, and one device in which a plurality of modules are housed in one housing are both systems.

In addition, the advantages described in the present specification are merely exemplary and not limited, and other advantages may be obtained.

The embodiment of the present technology is not limited to the above-described embodiments, and various modifications can be made without departing from the gist of the present technology.

For example, the present technology can be configured as cloud computing in which one function is shared and processed in common by a plurality of devices via a network.

In addition, the respective steps described in the above-described flowchart can be executed by one device or in a shared manner by a plurality of devices.

Further, in a case where a plurality of kinds of processing are included in a single step, the plurality of kinds of processing included in the single step may be executed by one device or by a plurality of devices in a shared manner.

<Combination Examples of Configurations>

The present technology can be configured as follows.

(1)

A wireless communication device including:

a wireless communication unit configured to transmit and receive signals to and from another wireless communication device; and a communication control unit configured to determine a coordination recommendation channel to be recommended to the other wireless communication device in order to perform coordination communication.

(2)

The wireless communication device according to (1), wherein the communication control unit determines the coordination recommendation channel on the basis of a primary channel set by itself and a desired bandwidth.

(3)

The wireless communication device according to (2), wherein the communication control unit determines another channel used when a signal is transmitted with a wide bandwidth as the coordination recommendation channel, the other channel being different from the primary channel.

(4)

The wireless communication device according to (2), wherein the communication control unit includes information indicating the coordination recommendation channel in a signal used for channel scanning and causes the wireless communication unit to transmit the signal.

(5)

The wireless communication device according to (4), wherein the signal used for channel scanning is a Beacon signal.

(6)

The wireless communication device according to (4), wherein the signal used for channel scanning is a Probe Response signal.

(7)

The wireless communication device according to (4), wherein the communication control unit includes at least one of information indicating the primary channel, conditions of the other wireless communication device that can perform coordination communication, and information indicating its own communication capability in the signal used for channel scanning and causes the wireless communication unit to transmit the signal.

(8)

The wireless communication device according to (1), wherein the wireless communication unit receives a coordination request signal for requesting coordination communication, the coordination request signal being transmitted from the other wireless communication device, the communication control unit generates a response signal including information shared with the other wireless communication device on the basis of information on a channel set by the other wireless communication device, the information being included in the coordination request signal, and the wireless communication unit transmits the response signal to the other wireless communication device.

(9)

The wireless communication device according to (2), wherein the wireless communication unit receives a coordination request signal for requesting coordination communication, the coordination request signal being transmitted from the other wireless communication device, the communication control unit determines switching of the primary channel on the basis of channel switching request information included in the coordination request signal.

(10)

The wireless communication device according to (9), wherein the communication control unit generates a response signal including a determination result for the channel switching request information, and the wireless communication unit transmits the response signal to the other wireless communication device.

(11)

The wireless communication device according to any one of (1) to (10), wherein the wireless communication unit transmits and receives signals to and from the other wireless communication device, separate from its subordinate wireless communication terminal.

(12)

The wireless communication device according to any one of (1) to (10), wherein the wireless communication unit receives a coordination request signal for requesting coordination communication, the coordination request signal being transmitted from the other wireless communication device, and the communication control unit determines the primary channel set by the other wireless communication device as the coordination recommendation channel, on the basis of the channel switching request information included in the coordination request signal and channel scanning results.

(13)

The wireless communication device according to (12), wherein the communication control unit generates a response signal including information indicating the primary channel set by the other wireless communication device, and the wireless communication unit transmits the response signal to the other wireless communication device.

(14)

A wireless communication method including causing a wireless communication device to:

transmit and receive signals to and from another wireless communication device, separate from its subordinate wireless communication terminal; and determine a coordination recommendation channel to be recommended to the other wireless communication device in order to perform coordination communication.

(15)

A wireless communication device including:

a wireless communication unit configured to transmit and receive signals to and from another wireless communication device, and receive a signal including information indicating a coordination recommendation channel recommended by the other wireless communication device in order to perform coordination communication; and a communication control unit configured to determine its own primary channel on the basis of the information indicating the coordination recommendation channel.

(16)

The wireless communication device according to (15), wherein the communication control unit causes the wireless communication unit to transmit a coordination request signal for requesting coordination communication to the other wireless communication device, the coordination request signal including information on the determined primary channel and a channel and a bandwidth used to transmit and receive signals to and from the other wireless communication device.

(17)

The wireless communication device according to (16), wherein the communication control unit includes transmission method information for performing communication with the other wireless communication device in the coordination request signal and causes the wireless communication unit to transmit the coordination request signal.

(18)

The wireless communication device according to (16), wherein the communication control unit includes channel switching request information for the other wireless communication device in the coordination request signal and causes the wireless communication unit to transmit the coordination request signal.

(19)

The wireless communication device according to (16), wherein the communication control unit causes the wireless communication unit to transmit a coordination request signal for requesting coordination communication to the other wireless communication device, the coordination request signal including information indicating a desired bandwidth and a channel scanning result.

(20)

A wireless communication method including causing a wireless communication device to:

transmit and receive signals to and from another wireless communication device and receive a signal including information indicating a coordination recommendation channel recommended by the other wireless communication device in order to perform coordination communication; and determine its own primary channel on the basis of the information indicating the coordination recommendation channel.

REFERENCE SIGNS LIST

11 Wireless communication device
12 Wireless communication terminal
21 Wireless signal processing unit
22-1, 22-2 Wireless communication unit
31 Communication control unit
32 Wireless interface unit
33 Data processing unit
34 Storage unit
41 Wireless transmission unit
42 Wireless reception unit
201 Wireless communication device

The invention claimed is:

1. A wireless communication access point comprising:
a wireless communication interface configured to transmit and receive signals to and from another wireless communication access point; and
processing circuitry configured to:
set a primary channel;
determine, at least on the basis of the set primary channel and a desired bandwidth, a coordination recommendation channel to be recommended to the other wireless communication access point, the coordination recommendation channel being specific to performing coordination communication between the wireless communication access point and the other wireless communication access point, and the coordination recommendation channel being a secondary channel;
include at least information indicating the coordination recommendation channel in a signal used for channel scanning;
cause the wireless communication interface to transmit the signal used for channel scanning using the primary channel to notify the other wireless communication access point of the coordination recommendation channel that is specific to performing the coordination communication between the wireless communication access point and the other wireless communication access point; and
perform the coordination communication with the other wireless communication access point using the coordination recommendation channel.

2. The wireless communication access point according to claim 1, wherein
the processing circuitry is configured to determine another channel used when a signal is transmitted with a wide bandwidth as the coordination recommendation channel, and
the other channel is different from the primary channel.

3. The wireless communication access point according to claim 1, wherein the signal used for the channel scanning is a Beacon signal.

4. The wireless communication access point according to claim 1, wherein the signal used for the channel scanning is a Probe Response signal.

5. The wireless communication access point according to claim 1, wherein the processing circuitry is configured to include at least one of information indicating the primary channel, conditions of the other wireless communication access point that can perform the coordination communication, or information indicating its own communication capability in the signal used for the channel scanning.

6. The wireless communication access point according to claim 1, wherein
the wireless communication interface is configured to receive a coordination request signal for requesting the coordination communication,
the coordination request signal is transmitted from the other wireless communication access point, and
the processing circuitry is configured to:
generate a response signal including information shared with the other wireless communication access point on the basis of information on a channel set by the other wireless communication access point, the information being included in the coordination request signal, and
cause the wireless communication interface to transmit the response signal to the other wireless communication access point.

7. The wireless communication access point according to claim 1, wherein
the wireless communication interface is configured to receive a coordination request signal for requesting the coordination communication,
the coordination request signal is transmitted from the other wireless communication access point, and
the processing circuitry is configured to determine switching of the primary channel on the basis of channel switching request information included in the coordination request signal.

8. The wireless communication access point according to claim 7, wherein the processing circuitry is configured to:
generate a response signal including a determination result for the channel switching request information, and
cause the wireless communication interface to transmit the response signal to the other wireless communication access point.

9. The wireless communication access point according to claim 1, wherein the wireless communication interface is configured to transmit and receive signals to and from the other wireless communication access point separate from its subordinate wireless communication terminal.

10. The wireless communication access point according to claim 1, wherein
the wireless communication interface is configured to receive a coordination request signal for requesting the coordination communication,
the coordination request signal is transmitted from the other wireless communication access point, and
the processing circuitry is configured to determine a primary channel for the other wireless communication access point as the coordination recommendation channel on the basis of channel switching request information included in the coordination request signal and channel scanning results.

11. The wireless communication access point according to claim 10, wherein the processing circuitry is configured to:
generate a response signal including information indicating the primary channel set by the other wireless communication access point, and
cause the wireless communication interface to transmit the response signal to the other wireless communication access point.

12. The wireless communication access point according to claim 1, wherein
the processing circuitry is configured to:
notify the other wireless communication access point of the coordination recommendation channel in a Beacon signal,
the wireless communication interface is configured to receive a coordination request signal for requesting the coordination communication,
the coordination request signal is transmitted from the other wireless communication access point, and
the processing circuitry is configured to:
generate a response signal including information shared with the other wireless communication access point on the basis of information on a channel set by the other wireless communication access point, the information being included in the coordination request signal; and
cause the wireless communication interface to transmit the response signal to the other wireless communication access point.

13. The wireless communication access point according to claim 1, wherein the processing circuitry is configured to cause the wireless communication interface to transmit the signal used for channel scanning using the primary channel to notify the other wireless communication access point of the coordination recommendation channel that is specific to performing the coordination communication between the wireless communication access point and the other wireless communication access point while the other communication access point performs channel scanning for setting a channel.

14. A wireless communication method comprising:
causing a wireless communication access point to:
transmit and receive signals to and from another wireless communication access point;
set a primary channel;
determine, at least on the basis of the set primary channel and a desired bandwidth, a coordination recommendation channel to be recommended to the other wireless communication access point, the coordination recommendation channel being specific to performing coordination communication between the wireless communication access point and the other wireless communication access point, and the coordination recommendation channel being a secondary channel;
include at least information indicating the coordination recommendation channel in a signal used for channel scanning;
cause the wireless communication interface to transmit the signal used for channel scanning to notify the other communication access point of the coordination recommendation channel that is specific to performing the coordination communication between the wireless communication access point and the other wireless communication access point; and
perform the coordination communication with the other wireless communication access point using the coordination recommendation channel.

15. A wireless communication access point comprising:
a wireless communication interface configured to:
transmit and receive signals to and from another wireless communication access point, and
receive, while performing channel scanning for setting a primary channel, a signal transmitted using a primary channel set by the other wireless communication access point and including information indicating a coordination recommendation channel recommended by the other wireless communication access point, the coordination recommendation channel being specific to performing coordination communication between the wireless communication access point and the other wireless communication access point, and the coordination recommendation channel being a secondary channel set by the other wireless communication access point; and
processing circuitry configured to:
determine the primary channel for the wireless communication access point on the basis of the information indicating the coordination recommendation channel and the channel scanning; and
perform the coordination communication with the other wireless communication access point using the coordination recommendation channel.

16. The wireless communication access point according to claim 15, wherein
the processing circuitry is configured to cause the wireless communication interface to transmit a coordination request signal for requesting the coordination communication to the other wireless communication access point, and
the coordination request signal includes information on the determined primary channel and a channel and a bandwidth used to transmit and receive signals to and from the other wireless communication access point.

17. The wireless communication access point according to claim 16, wherein the processing circuitry is configured to include transmission method information for performing communication with the other wireless communication access point in the coordination request signal.

18. The wireless communication access point according to claim 16, wherein the processing circuitry is configured to include channel switching request information for the other wireless communication access point in the coordination request signal.

19. The wireless communication access point according to claim 15, wherein
the processing circuitry is configured to cause the wireless communication interface to transmit a coordination request signal for requesting the coordination communication to the other wireless communication access point, and the coordination request signal includes information indicating a desired bandwidth and a channel scanning result.

20. A wireless communication method comprising:

causing a wireless communication access point to:
- transmit and receive signals to and from another wireless communication access point;
- receive, while performing channel scanning for setting a primary channel, a signal transmitted using a primary channel set by the other wireless communication access point and including information indicating a coordination recommendation channel recommended by the other wireless communication access point, the coordination recommendation channel being specific to performing coordination communication between the wireless communication access point and the other wireless communication access point, and the coordination recommendation channel being a secondary channel set by the other wireless communication access point;
- determine the primary channel for the wireless communication access point on the basis of the information indicating the coordination recommendation channel and the channel scanning; and
- perform the coordination communication with the other wireless communication access point using the coordination recommendation channel.

* * * * *